US008475894B2

(12) United States Patent
Noble et al.

(10) Patent No.: US 8,475,894 B2
(45) Date of Patent: Jul. 2, 2013

(54) ENGINEERED MOLDED FIBERBOARD PANELS, METHODS OF MAKING THE PANELS, AND PRODUCTS FABRICATED FROM THE PANELS

(75) Inventors: Robert Noble, Encinitas, CA (US); John F. Hunt, Mount Horeb, WI (US); Hongmei Gu, Madison, WI (US); Timothy L. Newburn, San Diego, CA (US); James F. Mahoney, Encinitas, CA (US); Coleen M. Lassegard, Encinitas, CA (US)

(73) Assignees: Nobel Environmental Technologies Corp., La Jolla, CA (US); The United States of America as Represented by the Secretary of Agriclture, Washington, DC (US)

( * ) Notice: Subject to any disclaimer, the term of this patent is extended or adjusted under 35 U.S.C. 154(b) by 829 days.

(21) Appl. No.: 12/412,780

(22) Filed: Mar. 27, 2009

(65) Prior Publication Data
US 2010/0078985 A1 Apr. 1, 2010

Related U.S. Application Data

(60) Provisional application No. 61/040,596, filed on Mar. 28, 2008.

(51) Int. Cl.
*B32B 3/12* (2006.01)
(52) U.S. Cl.
USPC ......... 428/34.2; 428/35.6; 428/116; 428/118; 428/136
(58) Field of Classification Search
USPC ....................................................... 428/34.2
See application file for complete search history.

(56) References Cited

U.S. PATENT DOCUMENTS

| 1,189,518 A | 7/1916 | Wood |
| 1,461,337 A | 7/1923 | Weiss |

(Continued)

FOREIGN PATENT DOCUMENTS

| AU | B-76372/91 | 5/1993 |
| JP | 09-052301 | * 2/1997 |

(Continued)

OTHER PUBLICATIONS

International Search Report and Written Opinion for PCT/US2009/38660 dated Dec. 19, 2009.

(Continued)

*Primary Examiner* — David Sample
(74) *Attorney, Agent, or Firm* — Stephen C. Beuerle; Katherine Proctor; Procopio Cory Hargreaves & Savitch LLP

(57) ABSTRACT

A honeycomb-shaped panel is formed from a plurality of generally sinusoidally shaped strips of molded fiberboard material each having spaced, oppositely directed flat peaks, the peaks of adjacent strips being secured together to form a plurality of hexagonally shaped cells extending perpendicular to the surfaces of the sheet. The strips may be cut from a single sheet of corrugated fiberboard sheet material and then secured together to form the honeycomb panel, or a plurality of such panels may be secured together face to face with their ribs aligned to form a stack, and selected cuts may be made through the secured, stacked panels to form a plurality of honeycomb panels of desired surface shape and height dimensions. The strips forming the cells are substantially rigid and resistant to collapse of the cells, and form a substantially rigid core when assembled between two flexible fiberboard skins, while the panel is bendable to adopt a desired panel curvature.

8 Claims, 31 Drawing Sheets

U.S. PATENT DOCUMENTS

| | | | |
|---|---|---|---|
| 1,488,504 A | | 4/1924 | Keyes |
| 1,519,694 A | * | 12/1924 | Muessman .................... 138/150 |
| 1,794,435 A | | 3/1931 | Barth |
| 1,972,500 A | * | 9/1934 | Toohey et al. ............... 138/145 |
| 2,058,334 A | | 10/1936 | Mason |
| 2,070,401 A | | 2/1937 | Greider et al. |
| 2,200,107 A | | 5/1940 | Weitz |
| 2,202,772 A | | 5/1940 | Durdin, Jr. |
| 2,313,434 A | | 3/1943 | Grether |
| 2,481,049 A | | 9/1949 | Stamm et al. |
| 2,640,517 A | | 6/1953 | de Mello |
| 2,722,311 A | | 11/1955 | Morrison |
| 2,764,193 A | | 9/1956 | Knowles |
| 2,766,787 A | | 10/1956 | Knowles |
| 2,785,717 A | | 3/1957 | Knowles |
| 3,083,128 A | | 3/1963 | Herrington et al. |
| 3,102,364 A | | 9/1963 | Pullen |
| 3,120,466 A | | 2/1964 | Bojanowski |
| 3,354,248 A | | 11/1967 | Haas |
| 3,372,018 A | | 3/1968 | Stocker et al. |
| 3,410,473 A | * | 11/1968 | Petrie ............................ 229/4.5 |
| 3,449,482 A | | 6/1969 | Mitchell |
| 3,575,768 A | | 4/1971 | Hannum |
| 3,720,176 A | | 3/1973 | Munroe |
| 3,832,108 A | | 8/1974 | Posch et al. |
| 3,861,326 A | | 1/1975 | Brown |
| 3,884,749 A | | 5/1975 | Pankoke |
| 4,061,813 A | | 12/1977 | Geimer et al. |
| 4,221,751 A | | 9/1980 | Haataja et al. |
| 4,267,137 A | | 5/1981 | Smith |
| 4,319,530 A | * | 3/1982 | Moog .......................... 108/51.3 |
| 4,409,274 A | | 10/1983 | Chaplin et al. |
| 4,544,344 A | | 10/1985 | Munk |
| 4,616,991 A | | 10/1986 | Bach et al. |
| 4,629,594 A | | 12/1986 | Munk |
| 4,675,138 A | | 6/1987 | Bach et al. |
| 4,702,870 A | | 10/1987 | Setterholm et al. |
| 4,753,713 A | | 6/1988 | Gunderson |
| 4,904,517 A | | 2/1990 | Lau et al. |
| 4,948,445 A | * | 8/1990 | Hees ............................ 156/196 |
| 5,000,673 A | | 3/1991 | Bach et al. |
| 5,156,901 A | * | 10/1992 | Tanaka ......................... 428/182 |
| 5,198,236 A | | 3/1993 | Gunderson et al. |
| 5,277,854 A | | 1/1994 | Hunt |
| 5,290,621 A | | 3/1994 | Bach et al. |
| 5,314,654 A | | 5/1994 | Gunderson et al. |
| 5,443,891 A | | 8/1995 | Bach |
| 5,538,775 A | * | 7/1996 | Kawakami et al. ............ 428/76 |
| 5,543,234 A | | 8/1996 | Lynch et al. |
| 5,660,326 A | * | 8/1997 | Varano et al. ................. 229/403 |
| 5,688,578 A | * | 11/1997 | Goodrich ...................... 428/136 |
| 5,702,052 A | * | 12/1997 | Bonner ......................... 229/4.5 |
| 5,738,924 A | | 4/1998 | Sing |
| RE35,830 E | * | 6/1998 | Sadlier ..................... 220/592.17 |
| 5,766,774 A | | 6/1998 | Lynch et al. |
| 5,830,548 A | * | 11/1998 | Andersen et al. ............ 428/36.4 |
| 5,833,805 A | | 11/1998 | Emery |
| 5,876,835 A | | 3/1999 | Noble et al. |
| 5,900,304 A | | 5/1999 | Owens |
| 5,964,400 A | * | 10/1999 | Varano et al. ................. 229/403 |
| 5,997,991 A | * | 12/1999 | Kato et al. .................... 428/182 |
| 6,190,151 B1 | | 2/2001 | Hunt |
| 6,306,997 B1 | | 10/2001 | Kuo et al. |
| 6,364,982 B1 | | 4/2002 | Lynch et al. |
| 6,451,235 B1 | | 9/2002 | Owens |
| 6,511,567 B1 | | 1/2003 | Ruggie et al. |
| 6,518,387 B2 | | 2/2003 | Kuo et al. |
| 6,541,097 B2 | | 4/2003 | Lynch et al. |
| 6,579,483 B1 | | 6/2003 | Vaders |
| 6,676,785 B2 | | 1/2004 | Johnson et al. |
| 6,773,791 B1 | | 8/2004 | Ruggie et al. |
| 7,074,302 B2 | | 7/2006 | Renck et al. |
| 7,077,988 B2 | | 7/2006 | Gosselin |
| 7,767,049 B2 | * | 8/2010 | Sadlier .......................... 156/205 |
| 2002/0022094 A1 | * | 2/2002 | Sherwood .................... 428/34.1 |
| 2003/0041547 A1 | | 3/2003 | Gosselin |
| 2005/0066619 A1 | | 3/2005 | McDonald |
| 2005/0138879 A1 | | 6/2005 | Snel |
| 2005/0274075 A1 | | 12/2005 | Freund et al. |
| 2006/0280883 A1 | * | 12/2006 | van de Camp ............... 428/34.2 |

FOREIGN PATENT DOCUMENTS

| | | |
|---|---|---|
| JP | 10-166481 | 6/1998 |
| JP | 13059310 | 3/2001 |
| JP | 15103666 | 4/2003 |
| WO | 2004054793 | 7/2004 |

OTHER PUBLICATIONS

Teddi Baron, From cow chips to cow barns, Inside Iowa State, May 19, 2000, available at http://www.iastate.edu/Inside/2000/0519/cowchips.html.

Tom L. Richard, Thinking outside the box: building materials and other products from animal processed fiber, Feb. 21, 2003, http://ageconsearch.umn.edu/bitstream/33179/1/fo03ri01.pdf.

Vivian Tracy, Ecowpots inventor makes haste with bovine waste, Sep. 2008, http://steve-lewis.blogspot.com/search?=bovine;.

J. Winandy and Z. Cai, Potential of using anaerobically digested bovine biofiber as a fiber source for wood composites, BioResources (Peer-review completed: Sep. 22, 2008; Revised version received and accepted: Oct. 8, 2008; Published: Oct. 10, 2008, available at http://www.ncsu.edu/bioresources/BioRes_03/BioRes_03_4_1244_WinandyCai_Using_Anaerob_Dig_Bovine_Fiber_Compos_332.pdf.

H. Spelter, J. Winandy, and J. Zauche, Anaerobically digested bovine biofiber as a source of fiber for particleboard manufacturing: An economic analysis, BioResources (Article submitted: Jul. 3, 2008; Peer review completed: Aug. 6, 2008; Revised version received and accepted: Sep. 22, 2008; Publication: Oct. 10, 2008), available at http://www.bioresourcesjournal.com/index.php/bioRes/article/viewFile/BioRes_03_4_1256_Spelter_WZ_ADBF_Particleboard/278.

L Matuana and M. Gould, Promoting the use of digestate from anaerobic digesters in composite materials, Oct. 24, 2006, available at https://www.msu.edu/~matuana/images/CompositesProjectfinalReport2.pdf.

Bench using bovine fiber built by John Hunt of Forest Products Laboratory, shown at World DairyExpo, Madison, WI, Oct. 2007 at the Ghd Inc. booth, 1 page.

Picture of Performance Designed Composites Research label, Forest Products Laboratory, Madison, Wisconsin, date unknown, 1 page.

John F. Hunt and Jerrold E. Winandy, 3D Engineered Fiberboard: A New Structural Building Product, Performance Engineered Composites, RWU4706, USDA Forest Service, Forest Products Laboratory, date unknown, 1 page.

David N, Goodman, Manure: you may be walking on it soon, Associated Press, Feb. 9, 2007, 3 pages.

International Search Report and Written Opinion from related PCT/US09/038650 dated Oct. 8, 2009.

* cited by examiner

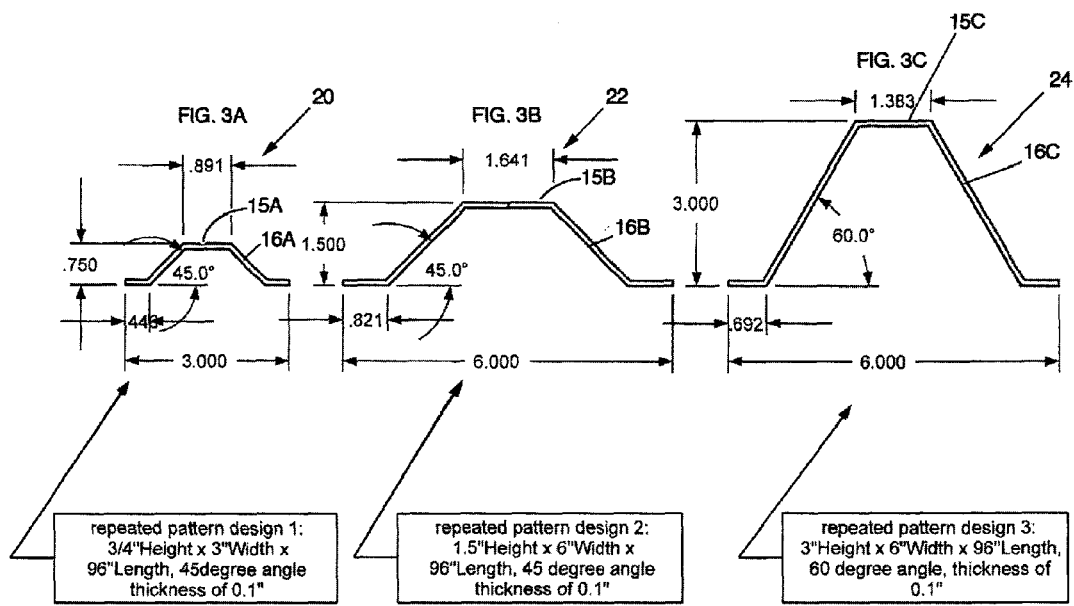

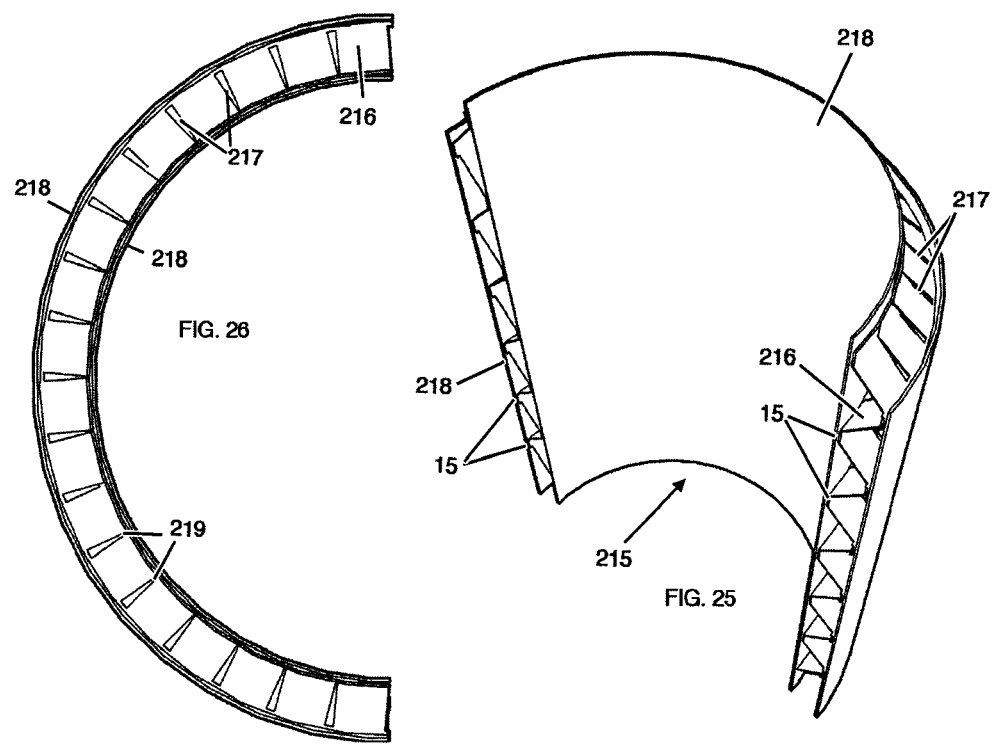

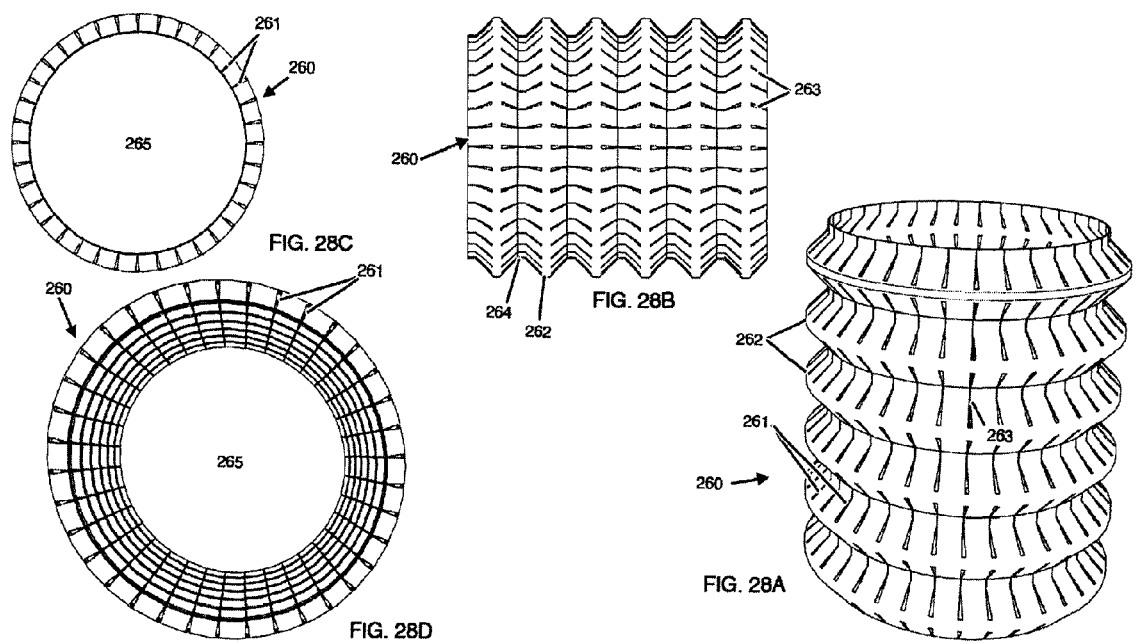

ENGINEERED MOLDED FIBERBOARD PANELS, METHODS OF MAKING THE PANELS, AND PRODUCTS FABRICATED FROM THE PANELS

RELATED APPLICATION

The present application claims the benefit of co-pending U.S. provisional patent application No. 61/040,596 filed Mar. 28, 2008, which is incorporated herein by reference in its entirety.

GOVERNMENT LICENSE RIGHTS

The U.S. Government has a paid-up, royalty-free, nonexclusive, nontransferable, irrevocable license in this invention and the right in limited circumstances to require the patent owner to license others on reasonable terms due to joint ownership of the invention and as provided for by the terms of CRADA (Cooperative Research and Development Agreement) No. 07-RD-11111124-027 awarded by the USDA, Forest Service.

BACKGROUND

1. Field of the Invention

This invention relates generally to engineered, pressure-molded fiberboard panel with applications in manufacturing, building construction, packaging, and other fields, and is particularly concerned with methods and apparatus for making such panels, panel core layers, multi-layer panels, and products made using such panels.

2. Related Art

"Dry-process" wood-product panels such as medium density fiberboard (MDF), particleboard (PB), and oriented strandboard (OSB) are known in the construction field. These products are largely manufactured by combining wood cellulose with formaldehyde-based resins and other bonding materials to form rigid panels. These panels are generally relatively heavy and not particularly flexible, and they are prone to toxic off-gassing caused by the resins used in manufacturing.

"Wet-process" panels are also known in the field. A "wet-process" panel is made by wet forming, i.e., panel materials and water are processed to form a slurry which is then poured over a form, and water is then removed by vacuum or the like. Known "wet-process" panels include mostly low-density cardboards, composite panel products, and agricultural fiberboards.

SUMMARY

In one embodiment, a fiberboard panel is formed from at least one corrugated sheet of molded cellulose fiber material having alternating ribs and grooves. The sheet is cut into strips of a selected length, rotating the strips through 90 degrees with the alternating ribs and grooves on one strip facing the ribs and grooves on the next strip, and adhering the strips together in a side-by-side fashion with the ribs of adjacent strips aligned and adhered together to form a honeycomb shaped sheet. The honeycomb sheet may be laminated as a core between two fiberboard flat panels to produce a higher strength, multi-layer panel. The height of the sheet panel or core of the laminated panel is determined by selection of the size of the strips used to form the honeycomb. Honeycomb sheets of different shapes may be formed, for example by cutting each strip with one or more non-straight or linear edges matching the edges of the other strips, for example one or two curved edges, one or two angled edges, multiple curved edges, compound curves, tapered or airfoil shapes, or the like. Alternatively, plural corrugated fiberboard panels may be first secured together in a stack with the ribs of adjacent panels aligned and adhered together, the stack having the desired honeycomb sheet dimensions, and then the cat may be cut transversely to form honeycomb sheets of the desired shapes and dimensions, including flat sheets and non-flat sheets.

The corrugated sheet and flat sheets (if used) for forming the honeycomb panel or multi-layer panel with a honeycomb core may be made from cellulose fibers such as bovine processed fiber (BPF), recycled fiber such as old corrugated cardboard (OCC) and old newsprint (ONP), wood fiber, agro-fiber, or combinations thereof, using wet processing. Through continuous hot-pressing of lignocellulosic fiber between mold elements, flat and three-dimensional panels can be molded into a specially engineered form. Continuous hot-pressing produces strong inter-fiber bonds, even using relatively low-quality fiber. Panels can be pressed flat, or a corrugated mold can be used to create longitudinal ridges. When a honeycomb structural core is bonded to flat-panel exterior skins, a lightweight, three-dimensional stressed-skin panel is formed that exhibits a high level of strength and stiffness.

The panel material may made from a wide range of cellulose fiber sources, including wood and plant fibers, agricultural biomass, and recycled fiber many fiber types may be used to manufacture the panels. In one embodiment, bovine processed fiber (BPF) is used for the panel material. BPF is bovine waste (i.e., agricultural fiber that has been consumed and digested by cows) that has been further processed using simple anaerobic digester technology commonly found at many cattle and dairy farms. BPF may be used by itself to make the panel, while in other embodiments it is used in combination with other fiber sources such as old corrugated cardboard (OCC) or old newspaper (ONP).

Fiberboard panels made using the above method have generally higher density, favorable strength-to-weight and strength-to-flexibility ratios, and overall eco-friendliness.

According to another aspect, a panel is made using corrugated sheet fiberboard material and two fiberboard sheets. In this case, the corrugated sheet is cut into wave-shaped strips which may be of different lengths, and the strips are adhered to one face of a flat fiberboard panel or sheet so as to extend generally upwardly from the sheet in a selected configuration. The second flat fiberboard sheet is then adhered to the upper edges of the strips. Multiple strips may be placed closer together in regions of the panel which encounter more stress during use, depending on the products made using the panels, while lower stress regions have less strips at larger spacings. For example, where the product is a piece of furniture using one or more panels, more strips are positioned in areas which will form junctions in the product, or at weight bearing areas corresponding to table, desk, or chair legs, and the like. The strip width, length, and shape may be varied to provide different panel shapes and performance characteristics.

In another embodiment, a curved stressed skin panel is provided which comprises a pair of outer skins or sheets of flat, bendable material and a bendable core layer which may comprise a honeycomb panel layer, a corrugated layer placed with the ribs running perpendicular to the direction of curvature, or a corrugated layer with slits across the ribs at least in the curved region, with the ribs running parallel to the direction of curvature. The curved panel may have a single radius, variable radius, or alternating (S-shaped) radius. The curved panel may have a single core layer or multiple core layers.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A, 3B and 3C are views similar to FIG. 2A of a set of corrugated panels having dimensions which increase incrementally from one panel to the next;

FIG. 25 is a perspective view of a second embodiment of a curved stressed skin panel using a slotted corrugated sheet as the core;

FIG. 26 is a side elevation view of the panel of FIG. 25;

FIG. 28A is a perspective view of one embodiment of a tubular member formed from a corrugated sheet with slits to provide increased flexibility;

FIG. 28B is a side elevation view of the tubular member of FIG. 28A;

FIG. 28C is an end elevation view of the tubular member of FIGS. 28A and 28B; and FIG. 28D is a perspective end view of the tubular member of FIGS. 28A to 28C.

DETAILED DESCRIPTION

Certain embodiments as disclosed herein provide for engineered molded fiberboard panels of various shapes and configurations, as well as methods and apparatus for making such panels, and products fabricated from such panels.

After reading this description it will become apparent to one skilled in the art how to implement the invention in various alternative embodiments and alternative applications. However, although various embodiments of the present invention will be described herein, it is understood that these embodiments are presented by way of example only, and not limitation.

Figure 1:
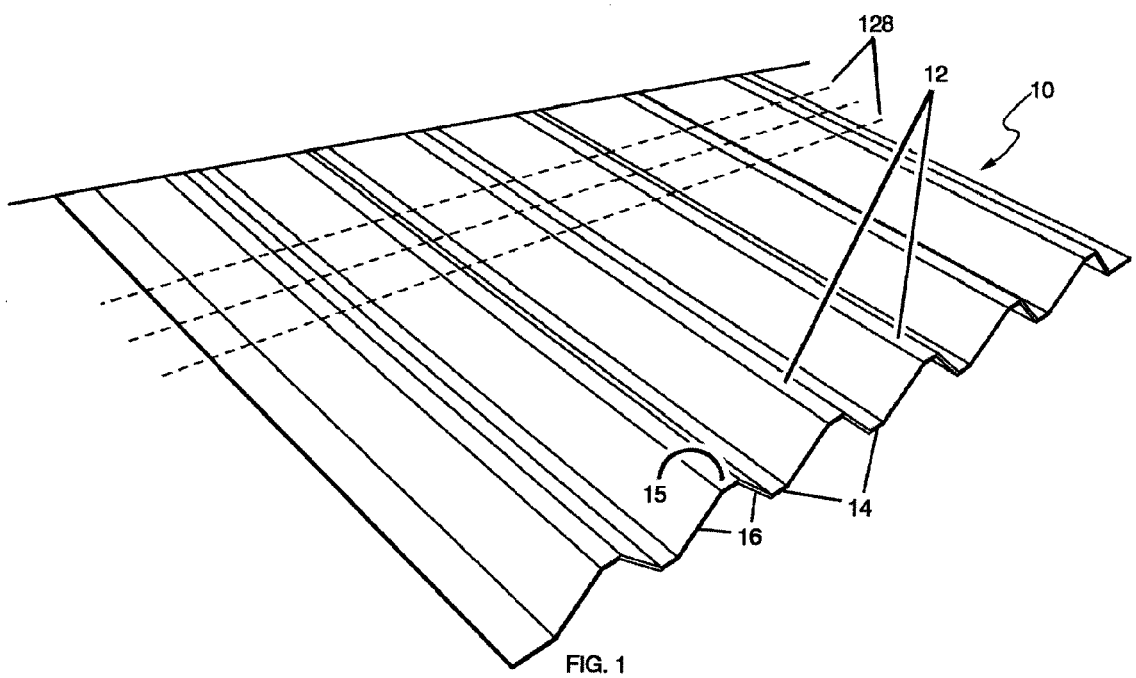
FIG. 1 is a perspective view of a corrugated fiberboard panel according to a first embodiment.
Figure 2:
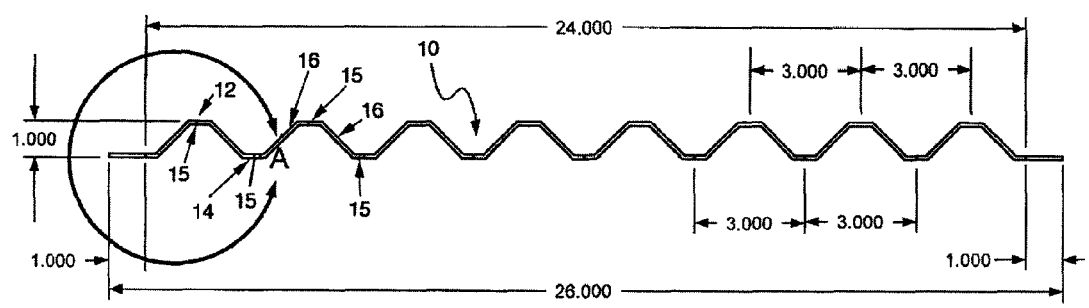
FIG. 2 is a cross sectional view of the panel of FIG. 1.

FIGS. 1 and 2 illustrate a corrugated fiberboard panel or sheet 10 with alternating ribs 12, 14 on its opposite faces. The panel is of molded fiber material and may be produced from a variety of materials and raw material mixes (matrices) including wood fiber, agro-fiber, including plant fibers and bovine processed fiber (BPF), and post-consumer waste such as old corrugated cardboard (OCC) and old newsprint (ONP). The panel may be manufactured using a modified "wet-process", as described in more detail below in connection with FIGS. 7 and 8. This process is similar to the process used for making paper and traditional fiberboard products, but without the addition of toxic resins or binders commonly found in many competitive panel products, especially those manufactured with older "dry-process" methods. This is possible because, with carefully controlled heat and pressure, the cellulose contained in a matrix of refined fibers (e.g., 50% OCC & 50% BPF) will react to form a natural thermosetting adhesive that gives strength and integrity to the finished fiber panel. In one example, the panel was made from around 50% BPF and 50% ONP. These materials are inexpensive but were found to combine in forming a relatively high strength, flexible panel or sheet. In some cases, depending on the application, the panel may be treated with fire retardant or other additives.

Figure 2A:
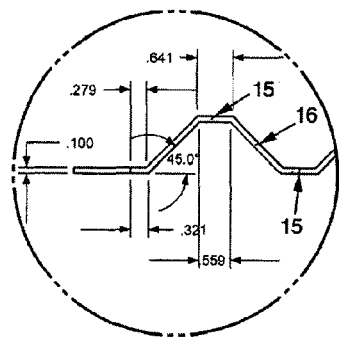
FIG. 2A is an enlarged view of the circled area of the panel of FIG. 2.
Figure 4:
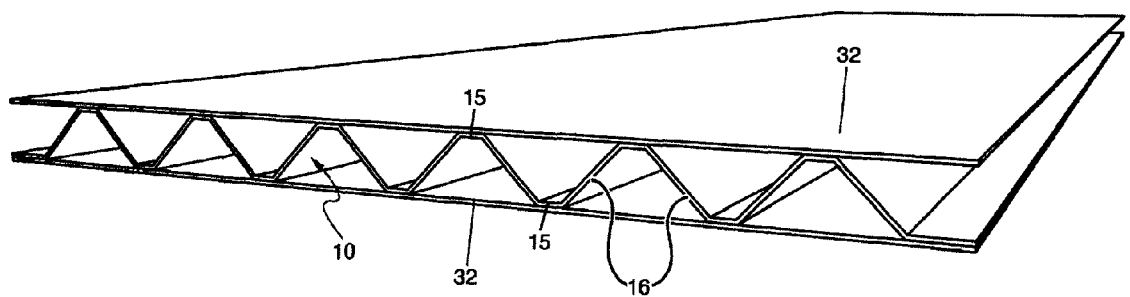
FIG. 4 is a perspective view of a laminated, stressed skin panel in which the corrugated panel of FIG. 1 is laminated between two flat fiberboard panels.

As illustrated in FIGS. 2 and 2A, each rib 12, 14 has a flat outer flange or peak 15, and adjacent, oppositely directed peaks are connected by inclined webs 16. It has been found that an angle of around 45 degrees for the webs 16 makes it easier to standardize different panel dimensions for combinations of panels with each other and with other building materials, although other angles may be used in alternative embodiments. Additionally, a constant rib-to-rib center spacing for different dimension panels makes it easier to laminate or combine different panels to produce different three dimensional panel arrangements and to make the panels compatible with other standard construction material dimensions. In one embodiment, a four inch center to center spacing between adjacent peaks or flanges 15 is provided. If such a panel is arranged vertically in a wall behind a wall board or the like, the outermost rib flanges are at a four-inch spacing and can be easily located for attachment of fasteners or the like. The flanges 15 are positioned at the opposing, outer faces of the panel 10 and provide a planar area to adhere or fasten to facing material, such as the skin of a stressed skin panel 20 as illustrated in FIG. 4. The flanges perform a similar function to the flange of a wide flange "I" cross section structural member. The 45 degree angle of the webs 16 allows for consistency in joining two such panels together as a "mitre" to accomplish a ninety degree change in direction, for example as illustrated in the panel described below in connection with FIG. 5.

The panel 10 may be made in a variety of different cross-sectional dimensions, panel thicknesses, flange dimensions, web dimensions, and rib cross section shapes. In one embodiment, the different panels are all calibrated to increments of ¼ inch, ½ inch, ¾ inch, 1 inch, or the like. This facilitates compatibility with building industry standards and makes measuring and locating internal flanges easier and faster for fastening. Also, for a basic 1.5" high panel, with ½" flanges, the flanges are exactly 4" on center (oc) which facilitates compatibility as above. FIGS. 2 and 2A illustrate a corrugated or ribbed cross section panel 10 which has a height of about one inch, a peak width of around 0.5 to 0.6 inches, a web angle of 45 degrees, and a panel thickness of around 0.1 inches. The peak center to center spacing may be in the range from 3 inches to 6 inches. This spacing may be made constant for at least some different panel dimensions and rib cross sections, to facilitate combinations of different dimension panels.

FIGS. 3A, 3B and 3C illustrate a set of three panels 20, 22, and 24 of incrementally increasing height (0.75 inches, 1.5 inches, 3 inches). The web angles of panels 20 and 22 are both 45 degrees, like panel 10 of FIGS. 1 and 2. In one embodiment, panel 20 has a repeated pattern design of ¾ inch height, 3 inch center to center width, 96 inch length and 45 degree angle, with a thickness of 0.1 inch. Panel 22 has a repeated pattern design of 1.5 inch height, 6 inch center to center width, 45 degree angle of webs, thickness of 0.1 inch, and 96 inch length. Panel 24 has a repeated pattern design of 3 inch height, 6 inch center to center width, a 60 degree web angle, 0.1 inch thickness, and 96 inch length. The panels have peaks 15A, 15B and 15C, respectively, and angled flanges 16A, 16B, and 16C, respectively, extending between each pair of oppositely directed peaks. Dimensions and angles may be determined for product performance when used in furniture, construction and other applications.

FIG. 4 illustrates one embodiment of a composite, stressed-skin panel 30 which is made by sandwiching a corrugated, ribbed panel such as panel 10 between two flat panels or skins 32 which are made from the same fiber material as panel 10 using the same manufacturing process. This creates a stressed-skin panel with a very high strength to weight ratio. The corrugated and flat panels 10, 32 are flexible prior to being adhered together, but once laminated they form lightweight stressed-skin panels or structural panels with high strength, while still exhibiting some flexibility.

Figure 5:
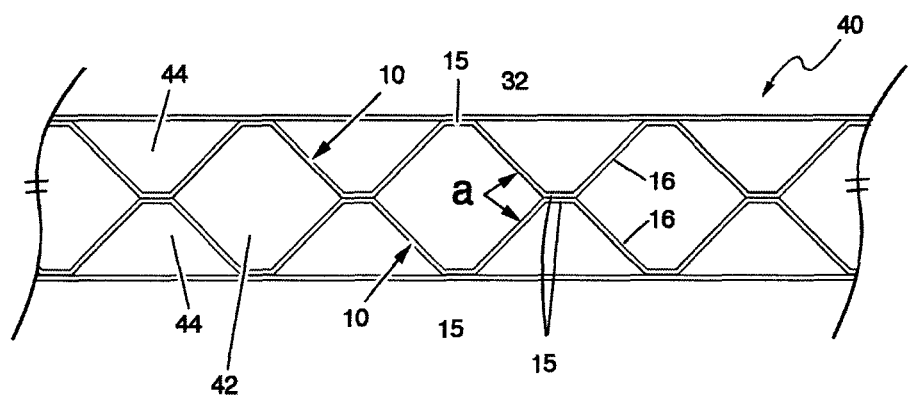
FIG. 5 is an end view of part of a modified laminated panel with two layers of corrugated panel as the core.

FIG. 5 illustrates a second embodiment of a composite stressed-skin panel 40. Panel 40 comprises a pair of corrugated panels 10 which are stacked one on top of the other with the inner rib peaks 15 aligned and adhered together, and which are then sandwiched between two flat panels or skins 32. The outer flat panels 32 are suitably adhered to the outermost flat peaks 15 of the respective panels 10. This creates a very strong and rigid panel. Since the angled webs 16 of the two corrugated panels 10 are each at 45 degrees, this creates a 90 degree change in direction (see Angle "a" in FIG. 5, for example). It also creates channels 42, 44 of different sizes which can be used for air distribution and as a pathway for conduit, pipes, building wiring, or the like through the panel.

Figure 6:
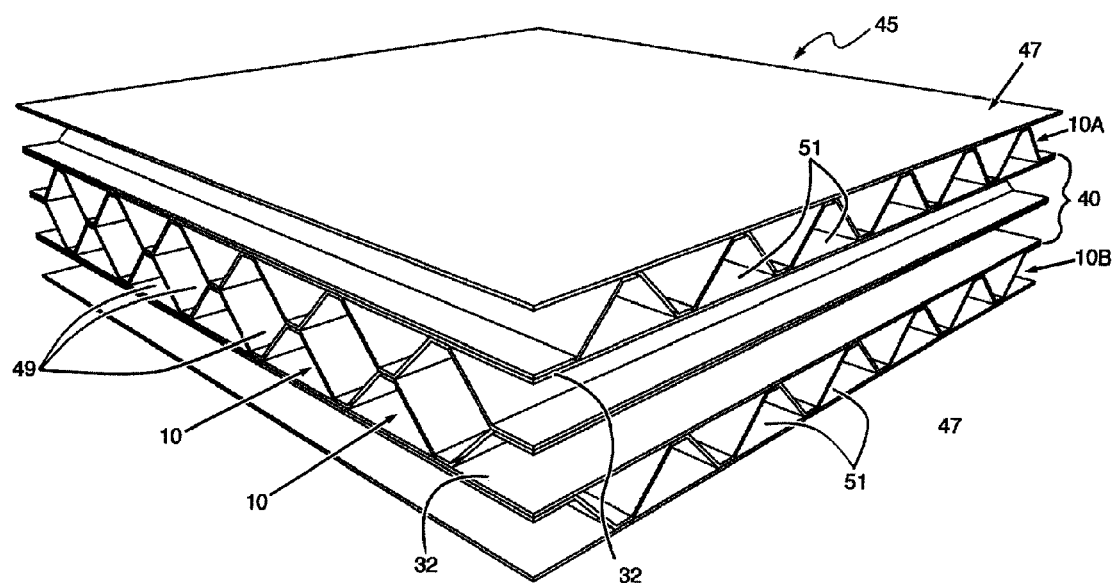
FIG. 6 is a perspective view of another embodiment of a multi-layer panel using multiple flat sheets and corrugated sheets.

FIG. 6 illustrates a third embodiment of a multi-layer, stressed-skin panel 45. This panel uses the three layer panel 40 of FIG. 5 as the core. A first outer corrugated sheet 10A is adhered to one of the outer panels 32 of core 40 with its ribs extending perpendicular to the ribs of the two central ribbed sheets 10 of the core. A second outer corrugated sheet 10B is adhered to the other outer panel 32 of core 40. Finally, two outer flat sheets or skins 47 are adhered to the outer faces of corrugated sheets 10A and 10B. The multi-layer panel thus has four core layers of corrugated sheet material, with the ribs of the two central layers extending in a first direction and the ribs of the two outer corrugated layers 10A and 10B extending transverse to the first direction. In one embodiment, the ribs of the central layers are arranged to be oriented horizontally if the panel 45 is used as a vertical construction or wall panel, with the ribs of the outer corrugated layers extending vertically.

The multi-layer panel 45 has plural passageways 49 extending through the center section in a first direction, as well as plural passageways 51 which extend transverse to passageways 49 in each outer section. This arrangement allows for horizontal distribution of air or conduit, pipes, wiring and the like along each panel and continuing through to the next panel. It provides an integral mini duct/conduit guide configuration. Some of the horizontal passageways can be used for air distribution, with others used as a pathway for wiring pipes, cables, and/or conduit. The vertical outside channels or passageways 51 allow for insulation and/or reinforcing material to be cast into the outer layers of the panel. Reinforcing materials such as concrete with metal or fiberglass tension resistant components may be used for this purpose, producing a highly efficient configuration placing the high strength materials out along the face away from the central axis, oriented vertically for improved buckling, uplift and compression resistance of the wall assembly.

Panel 45 is of low cost due to use of simple corrugated components with alternating orientation providing a high strength, low weight basic configuration. Additional weight such as additional layers may be added for strength if needed. The panel is of simple construction and allows for various attachment methods.

The corrugated fiberboard sheets and composite panels of FIGS. 1 to 6 have improved structural integrity and may be up to 4 times stronger than other panels of similar weight such as foam boards or paper honeycomb products. At the same time, the panels are lightweight, and may be as little as 25% of the weight of conventional panels engineered to the same bending strength, such as particleboard, plywood, medium density fiberboard (MDF) or oriented strand board (OSB). The panels are all light and durable panels, and are therefore easy to lift and transport. The light weight of the panels also results in reduced shipping and installation costs, and reduced injury and liability exposure in factory locations and on construction sites. The absence of chemicals and toxins in production process also makes the panels safer and gives rise to fewer regulatory issues due to non-toxic production process. The panels can be self supporting soffets and valances without the need for an elaborate secondary structural frame In one embodiment, the ribbed panels and flat panels described above are made by a process which involves:

1. Mechanical, chemical or other digestion of selected fiber or fibers into a "furnish."

2. Hydro pulping of the digested furnish (introducing into a water solution and mixing to separate all fibers into a "pulp").

3. Introduction of the pulp into the former (or deckle) box which has the perforated "mold screen" at its bottom. The mold screen has a cross section almost identical with the desired cross section of the finished panel, i.e., a ribbed or corrugated section when making the panels of FIGS. 1 to 3, or a flat section when making flat panels or skins 32.

4. Most of the water is removed through the perforated mold screen by a vacuum pulled from below. The remaining fiber mat has significantly even distribution of fibers with respect to thickness and fiber direction.

5. The walls of the former box are lifted, like a sleeve, up from the perimeter edge of the mold screen, which is sitting on the bottom structure of the former box.

6. The mold screen with the wet fiber mat is then transferred longitudinally into a cold press between the press's top and bottom platens which have cross sections virtually identical to the mold screen.

7. The cold press opening is then closed and pressurized to squeeze the water out of the wet mat on the mold screen. This water removal assists in reducing the time and energy requirements in the next step of hot pressing.

8. After the platens are separated, the mold screen with wet mat is then transferred into a hot press with top and bottom platens similar in cross section to the cold press. The hot platens then close on the cold-pressed wet mat on the mold screen. Additional de-watering occurs by squeezing and by vaporization, along with cellulose bonding.

9. When the mat has been densified due to heat and pressure and is virtually moisture free, the platens are separated and the mold screen and finished panel is transferred out of the press.

10. The finished panel is then separated from the mold screen, and the mold screen is returned to the former box for the next cycle.

11. The finished panel may then be sent to post-production, for cutting, adhering, laminating, or the like.

Both cold and hot press design may include a top perforated screen attached to the top platen, or, a top screen may be placed on the wet mat prior to entry into the cold press. The top screen fixed to the upper platen of the cold press opening simplifies production. In addition, an elastic, non porous material may be used to increase dewatering and densification of the mat in the cold press and hot press.

In the case that the top screen is not fixed to the top platens, the top screen is transferred through both the cold and hot press and be removed after hot pressing to be returned to the former box exit transfer area to be placed on a wet mat on mold screen exiting the former box.

The first stage of panel manufacturing (steps 1 and 2 above) is a wet-forming process whereby cellulose fibers and water are hydropulped to form slurry that is then poured over a form (step 3). In step 4, vacuum suction is applied to the bottom of the mold, thus pulling the water through the mold, but leaving the fiber to form into a flat or three-dimensional mat. When all the "free" water is pulled through the mat, the residual moisture content is about 80%. Additional cold pressing in steps 6 and 7 removes more "free" water, leaving only a minimal amount of "free" water and the saturated fibers. The formed mats are then placed in a hot press until dry (step 8). In one embodiment, the hot press conditions were 370° F. with continuous 200 psi pressure. The pressure profile slowly increases from 0 psi until it reaches 200 psi. The final target panel thickness is nominally 0.1 inch with a specific gravity of 0.9 to 1.0.

Figure 7:
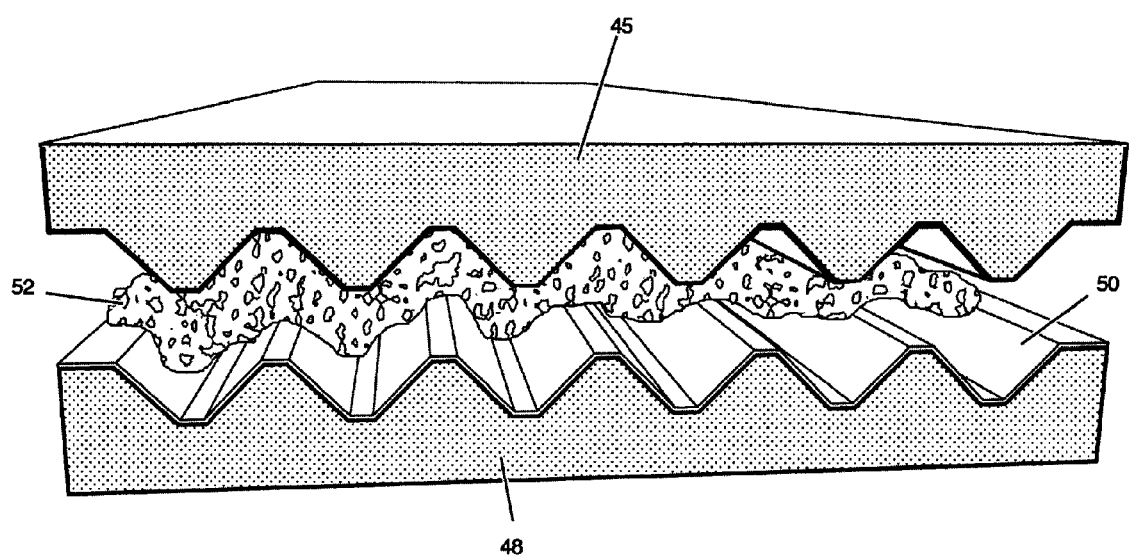
FIG. 7 is a cross-sectional view illustrating the opposing platens of a cold or hot press used in manufacturing the corrugated fiberboard sheet of FIG. 1.

FIG. 7 illustrates one arrangement of opposing upper and lower platens 45, 46 in the cold and hot presses used in the process described above to make a corrugated or ribbed panel. The lower platen 46 comprises a bottom, perforated plate or mold 48 of stainless steel or the like which has a corrugated shape corresponding to the desired panel shape and dimensions, and a perforated mold screen 50 of matching shape positioned on top of plate 48. Screen 50 is used to carry the wet fiber mat 52 from the former box into the cold press, and also to carry the mat 52 after cold pressing from the lower plate of the cold press onto the lower plate of the hot press, as described above. The upper platen 45 in this embodiment comprises a single platen of non-perforated or non-porous elastomeric material having a lower surface shaped to substantially match the shape of the lower platen and the desired panel. The material of top platen 45 may be silicone based. Use of an elastomeric or rubber material for the top platen has been found to increase compression in the hot and cold press, increasing dewatering and densification of the mat. It also creates a smoother top surface in the panel.

Figure 8:
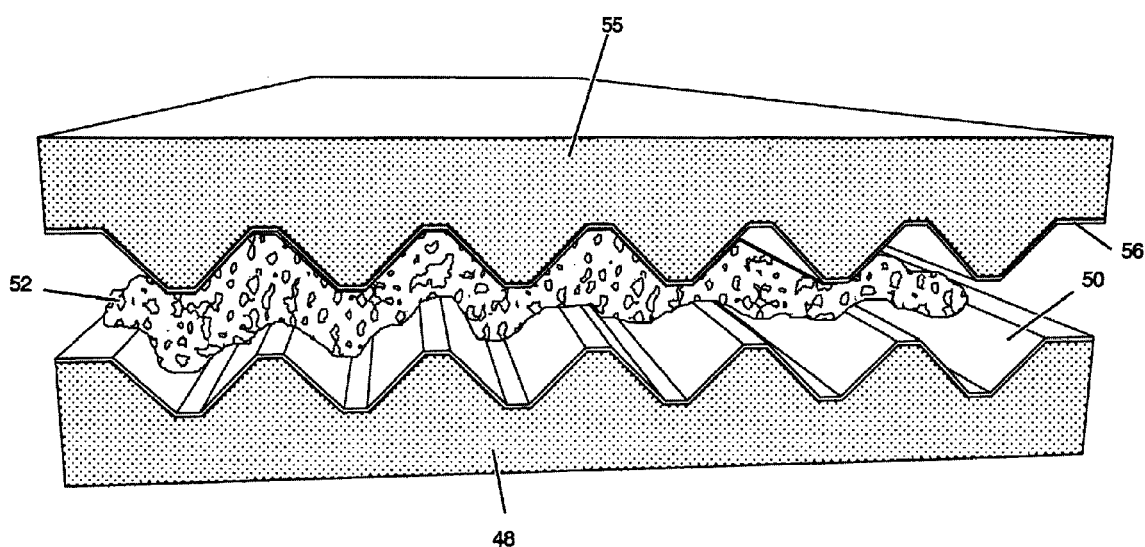
FIG. 8 is a cross-sectional view illustrating a cold or hot press similar to FIG. 7 but with a modified upper platen.

FIG. 8 illustrates an alternative arrangement of the hot or cold press, in which the lower platen is identical to that of FIG. 7, but the elastomeric upper platen 45 is replaced with a rigid, perforated upper platen or press plate 55 of the desired shape, and a perforated top mold screen 56 fixed to the platen 55. In alternative arrangements, the top mold screen 56 is not fixed to the top platen in the hot or cold press. In this case, the top screen is transferred from the cold press to the hot press and is removed from the panel after hot pressing is complete to be returned to the former box exit area for placing on a wet mat carried on the lower mold screen when exiting the former box.

Using stainless steel molds, the above process may be used to create corrugated, three-dimensional panels and flat sheets with a nominal material thickness of 0.03"-0.33". Corrugated panels may have cross-sectional depth of from 0.5" to 1.5" and greater. These products may be laminated together to create exceptionally strong yet lightweight "stressed-skin" panels in various sizes and dimensions, for example the panels illustrated in FIGS. 4 and 5 above. When laminated together, one corrugated panel sandwiched between two flat panels forms a stressed-skin panel with a 3-dimensional geometric core that provides lateral stiffness and support to the two exterior faces. The resulting panels are lightweight and have high strength characteristics and design flexibility. This strength-to-weight characteristic is a result of the geometry of stressed-skin panels that, like an airplane wing, depend not upon a solid core of material for bending integrity, but upon the strength of the faces and integral ribs.

The wet forming process as described above for manufacturing fiberboard panels may use almost any type of fiber, extracting and incorporating cellulose from a host of organic and post-consumer waste materials, including urban sources of post-consumer fiber waste such as OCC and ONP, and rural sources of underutilized agricultural fiber such as BPF and crop residues. These highly sustainable fiber sources are much more widely distributed and more readily available than virgin wood, or even waste wood fibers, and can be utilized at much lower cost. This means that the panels may be manufactured in many regions, using many fiber sources, under a variety of conditions. In urban areas, the panels can utilize waste paper, cardboard, newsprint and other post-consumer waste materials that are plentiful in all cities and towns. In rural areas, an abundance of agricultural fibers, including raw plant fibers and bovine processed fiber (BPF) may be used as raw materials for the panels. The panels may be made using unused cereal crop residues such as wheat straw and rice straw, dedicated fiber crops (e.g., hemp, flax, kenaf). On cattle ranches and dairy farms, bovine waste (manure) is greatly underutilized, except as fertilizer and bedding. But with natural and mechanical digestion (via anaerobic digester technology already in use at many farms), this natural source of cellulose fiber may be used as a primary fiber source for the panels described above. As an added benefit, the methane produced as a natural byproduct of bovine fiber processing can be used to generate heat and electricity to run the production line. Water, another bi-product of dairy farm anaerobic digesters, can be used for the wet production process as well, with most of the water being reclaimed and recycled. These production enhancements may be achieved with only slight modifications to existing technology. In forested areas, the forest products industry has established long-standing centers for building product raw material sourcing and manufacturing. Many virgin fiber, as well as pre- and post-consumer fiber sources of raw materials, are available in forested areas in the northwest and southeast U.S., and elsewhere, and such materials may also be used in panel manufacture.

In or near parks and managed forest lands, panels may be manufactured from wood "waste" and undergrowth currently identified as "fire hazard" material by USDA in its National Fire Plan (NFP) for the reduction of fire hazards in the National, State, and private forests. According to the USDA, many forest stands in the Unites States are overcrowded and need to be thinned as part of good forest management. In the view of the traditional forest products industry, however, thinned forest materials are considered economically non-viable—i.e., too small and/or containing too many defects for structural lumber, and/or too costly to transport out of the forest for most commercial purposes. As a result, these underutilized wood fiber materials are often left on the forest floor. In seasonally dry environments typical of the western U.S., this wood-waste buildup can become a significant wildfire hazard, as recent history has shown, threatening not only old-growth trees and virgin timber, but also commercial and residential structures in the vicinity. The manufacturing process described above may provide an economically viable means to utilize this potentially dangerous forest material on a commercial scale while supporting public policy initiatives to reduce forest fire hazards and improve forest management.

In tropical and other regions (with or without crops, farms, or forests), prairie, tropical and other grasses, along with other waste or underutilized fibers, may be used to manufacture the panels. Prairie, tropical and other grasses are abundant throughout the world, and they are known to contain excellent cellulose fiber for wet process engineered molded fiber panel production. Although not yet utilized to the extent of wood-based fiber sources, sufficient research has shown the viability of these raw materials from all over the world. The ubiquity and diversity of possible raw material sources allows for potential panel production sites in the vicinity of each fiber source, potentially cutting down transportation and delivery distances to market, thereby reducing costs for bringing the panels and products made from the panels from factory to end-user. In addition, panel production near end users results in lower fuel consumptions and less pollution related to the transport/distribution process. Reduced weight of the final product (as low as 25% of traditional wood-fiber panels and materials) also significantly reduces the cost of shipping and delivery. In sum, the energy and labor efficiencies (along with the attendant environmental benefits) of producing lighter, significantly less toxic, easier to handle products nearer to the final market are abundant.

Although various different fiber sources for manufacturing the panels of FIGS. 1 to 6 have been described above, some improved panel properties have been found when combinations of two different fiber types with different properties are used. In one embodiment, a mixture of approximately 50% BPF and 50% ONP was found to have improved cellulose bonding and strength properties and result in more uniform densification due to the different fiber types.

Figure 9:
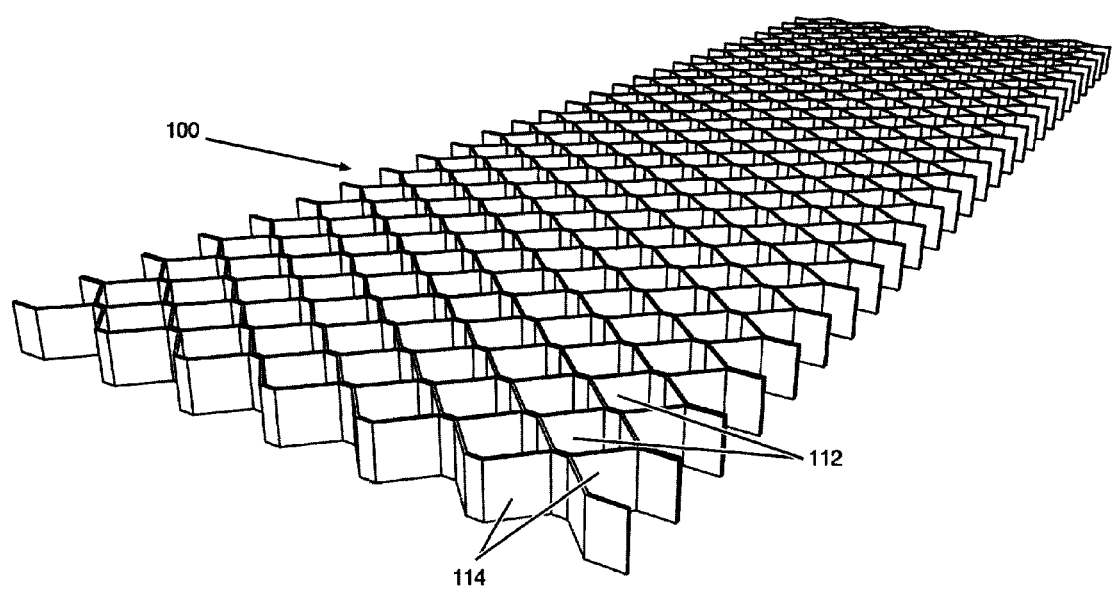
FIG. 9 is a perspective view of one embodiment of a honeycomb-shaped fiberboard panel manufactured from a corrugated sheet as illustrated in FIG. 1.

FIG. 9 illustrates one embodiment of a honeycomb-shaped panel 100 of molded fiberboard, the panel comprising a plurality of repeating, hexagonal cells 112 with webs 114 which are generally perpendicular to the plane of the panel. In one embodiment, the panel is of molded fiber material and may be produced from a variety of materials and raw material mixes (matrices) including wood fiber, agro-fiber, including plant fibers and bovine processed fiber (BPF), and post-consumer waste such as old corrugated cardboard (OCC) and old newsprint (ONP). Although the webs 114 are perpendicular to the plane of the panel in FIG. 1, they may be at other angles relative to the plane of panel 100 in alternative embodiments.

Figure 10:
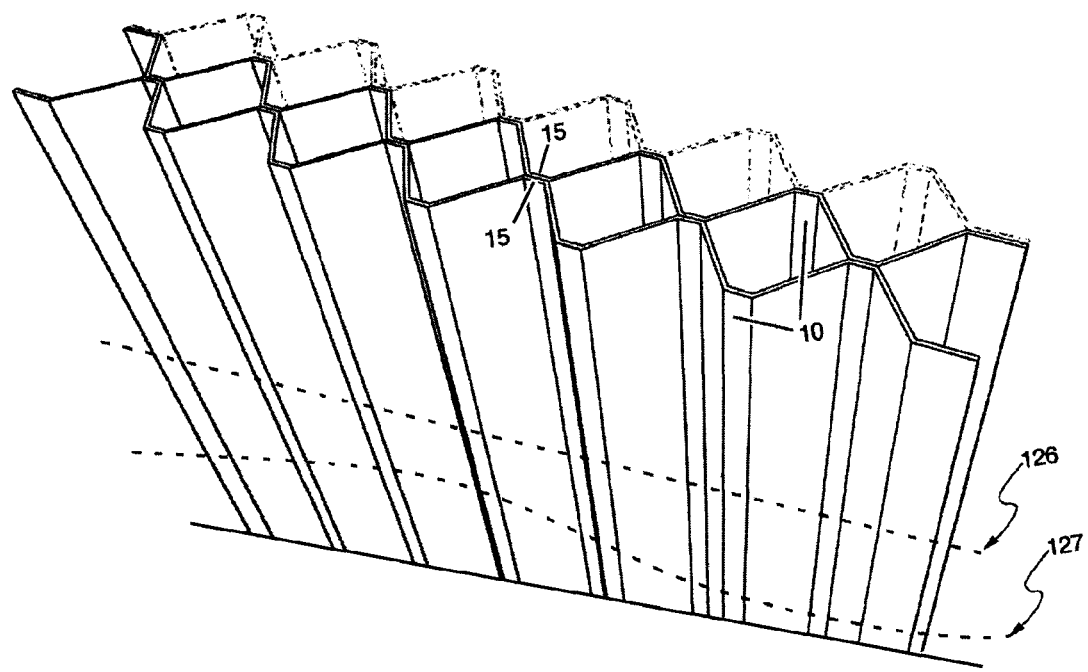
FIG. 10 is a perspective view of two lengths of corrugated sheet material turned through ninety degrees and placed face to face with their ribs aligned.

The panel 100 may be manufactured from corrugated sheets 10 of molded fiberboard material as illustrated in FIG. 1 which have alternating ribs and grooves forming the corrugated shape. In order to make a honeycomb-shaped panel, two such sheets, or two cut lengths or strips of sheet 10, are turned through 90 degrees from the position of FIG. 1 and placed face to face with their ribs aligned as in FIG. 10, and the abutting flat peaks or flanges 15 of the ribs are secured together with a suitable adhesive. This process is then repeated with additional lengths or strips of the corrugated sheet, or additional sheets 10, until the desired panel length is achieved. When plural corrugated sheets are secured together in the manner illustrated in FIG. 10, the assembled panel can be cut to a desired height, for example along dotted line 126 of FIG. 10. If one or both panel faces are to be non-straight, the assembled panel structure can be cut along a suitably shaped line, such as curved line 127 of FIG. 10, to provide the desired surface contour to the honeycomb panel. In an alternative method, a corrugated sheet 10 as in FIG. 1 is cut into a plurality of short strips of height corresponding to the desired panel height, for example along dotted lines 128 of FIG. 1, and the strips are then turned into the orientation of FIG. 10 and placed face to face with their opposing rib peaks 15 abutting and adhered together. Versatility of shape, thickness and strength of the honeycomb panel 100 may be achieved by suitable variation of the strip width and shape. The thickness and cross-sectional dimensions of the corrugated panel 10 used to form the honeycomb panel 100 may also be varied according to the desired panel performance and design parameters. Variable finished honeycomb panel depth, shape, and other characteristics may be achieved by varying the parameters of the source corrugated panel 10, by changing the width or shape of the cut strips forming the panel, or by shaping the panel after the strips or lengths of panel are adhered, as indicated in FIG. 10.

The honeycomb panel 100 of FIG. 9 is significantly more rigid in a direction perpendicular to the panel than a corresponding cardboard, accordion-like honeycomb sheet. Cardboard honeycomb is also collapsible inwardly into a flat configuration. In contrast, the webs forming the cells of panel 100 are relatively rigid and cannot be collapsed inwardly. Thus, panel 100 tends to hold its formed peripheral shape. However, depending on the selected panel thickness or height, the panel 100 may be flexed or curved to form different curved shapes, for example when forming a curved, multi-ply panel as described below in connection with FIGS. 24 to 26, or any of the products described below in connection with FIGS. 27 and 28. Alternatively, the panel 100 can be cut into any desired shape before laminating between opposing skins or flat sheets, as described below in connection with FIGS. 11 to 15.

Figure 11:
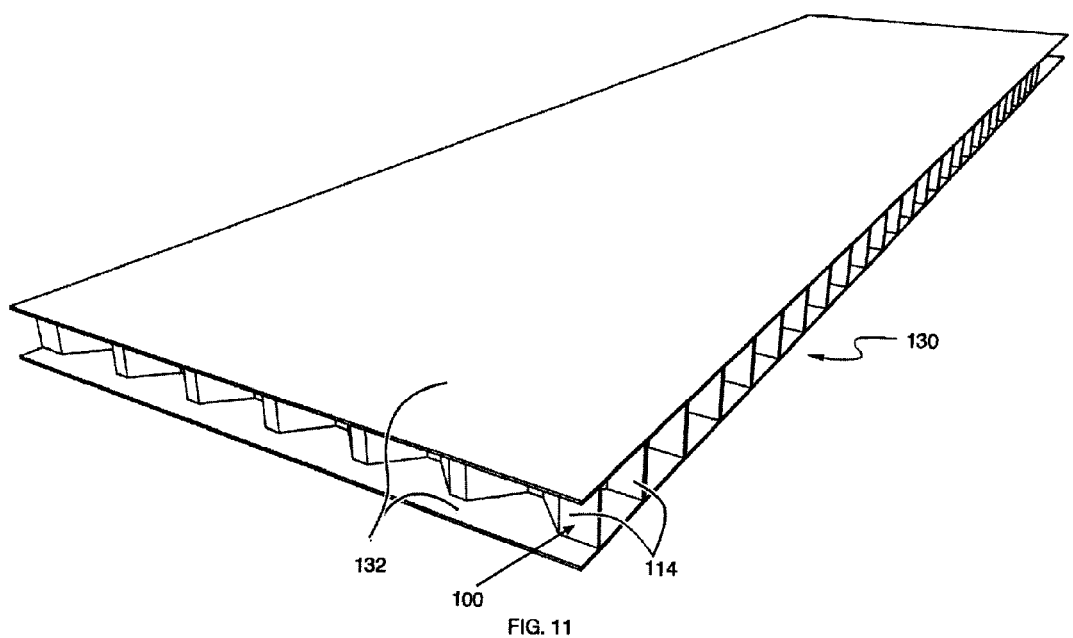
FIG. 11 is a perspective view of a laminated, stressed skin panel in which the honeycomb panel of FIG. 9 is laminated between two flat fiberboard panels.
Figure 12:
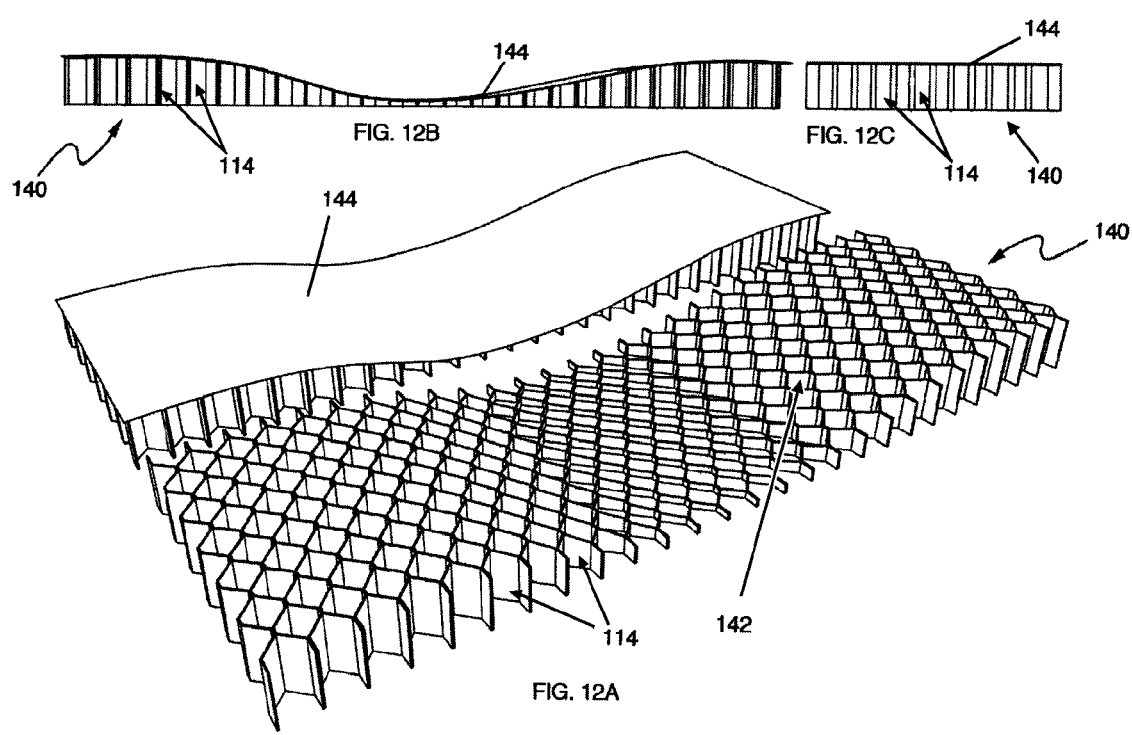
FIG. 12A is a perspective view of another embodiment of a honeycomb panel with an upper curved surface.
FIG. 12B is a side elevation view of the honeycomb panel of FIG. 12A.
FIG. 12C is an end elevation view of the honeycomb panel of FIG. 12B.
Figure 13:
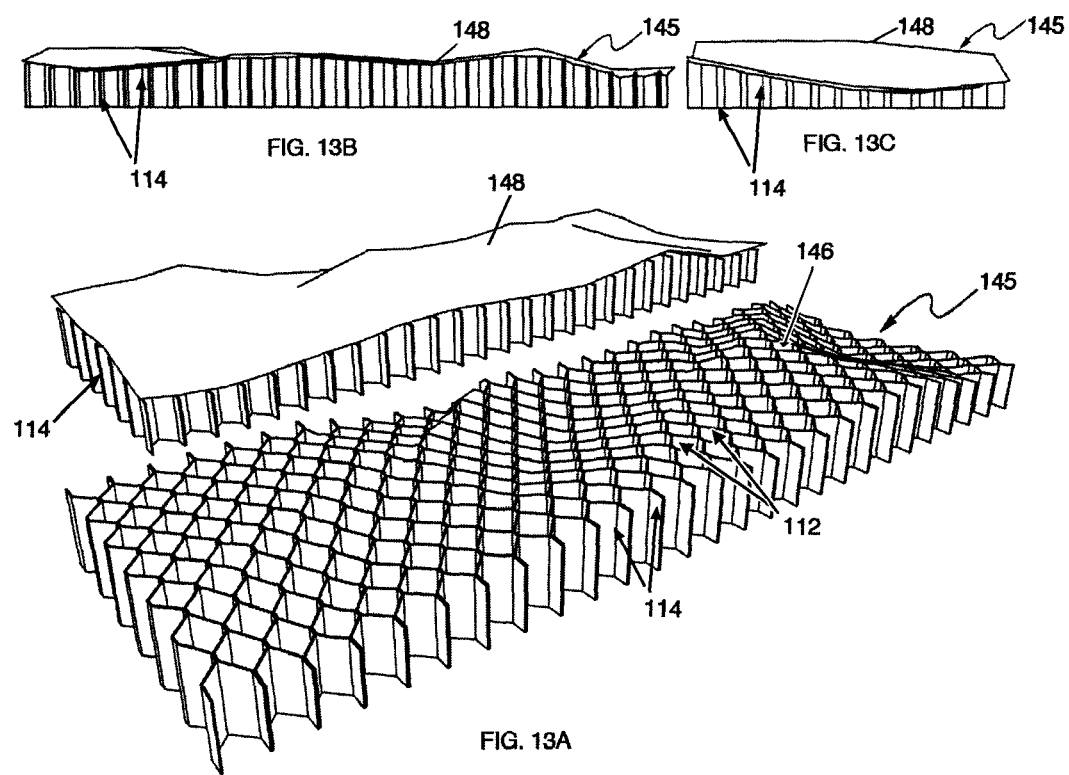
FIG. 13A is a perspective view of another embodiment of a honeycomb panel with an upper faceted face.
FIG. 13B is a side elevation view of the honeycomb panel of FIG. 13A.
FIG. 13C is an end elevation view of the honeycomb panel of FIG. 13B.
Figure 14:
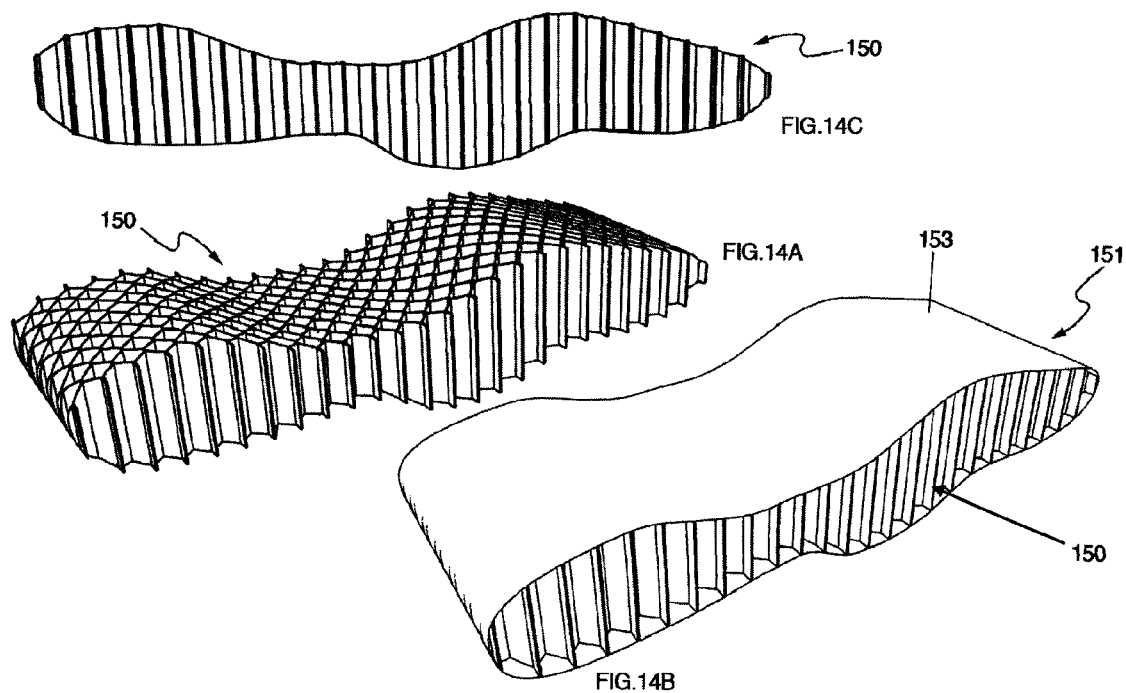
FIG. 14A is a perspective view of another embodiment of a honeycomb panel having opposing curved faces.
FIG. 14B is a perspective view of a stressed skin panel with the honeycomb panel of FIG. 14A as the core.
FIG. 14C is a side elevation view of the panel of FIG. 14A.
Figure 15:
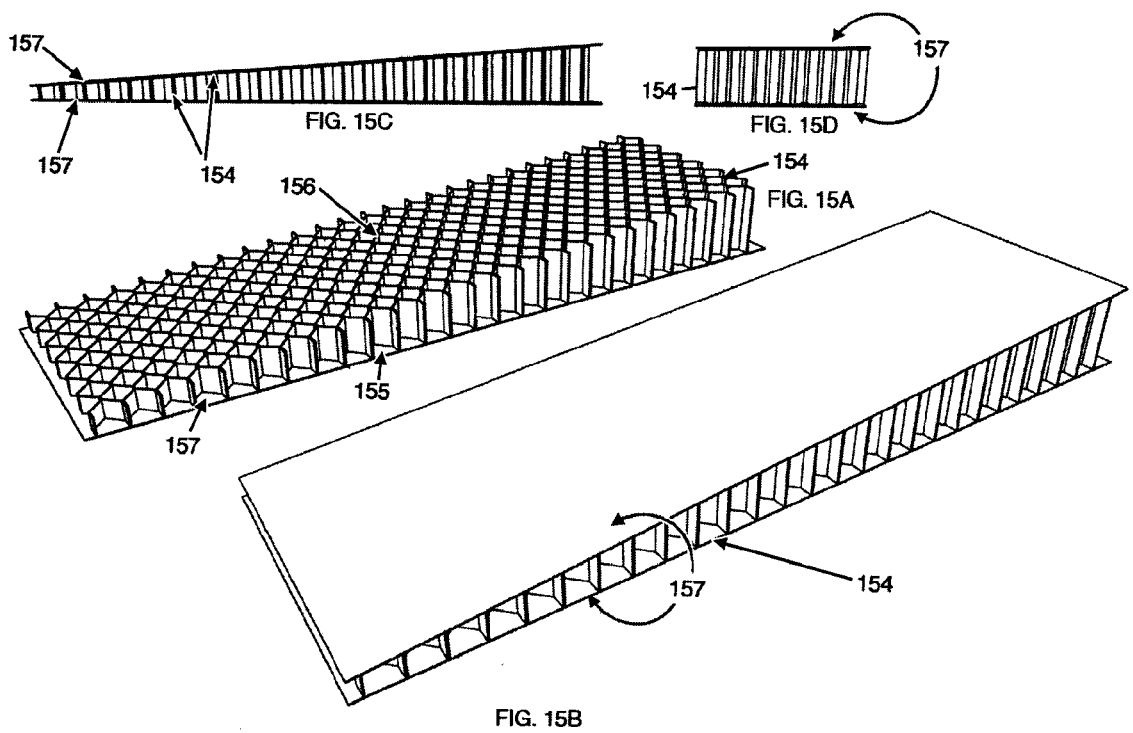
FIG. 15A is a perspective view of another embodiment of a honeycomb sheet having an angled face with the flat face adhered to a lower flat sheet.
FIG. 15B is a perspective view of a multi-ply panel in which an upper flat sheet is secured over the upper angled face of the honeycomb sheet of FIG. 15A.
FIG. 15C is a side elevation view of the panel of FIG. 15B.
FIG. 15D is an end elevation view of the panel of FIG. 15B.

FIG. 11 illustrates one embodiment of a composite, stressed-skin panel 130 which is made by sandwiching a honeycomb panel such as panel 100 of FIG. 9 between two flat panels or skins 132 which are made from the same fiber material as panel 100, using a modified wet-forming process as discussed above. This creates a stressed-skin panel with a very high strength to weight ratio. The honeycomb and flat panels 100, 132 are flexible prior to being adhered together, but once laminated they form lightweight stressed-skin panels or structural panels with high strength, while still exhibiting some flexibility.

FIGS. 12A to 12C illustrate a modified honeycomb panel 140 with a curved upper surface 142. The panel 140 may be laminated between two flexible panels or skins 144 as illustrated in the upper part of the drawing, or may be a stand-alone honeycomb panel or core. Panel 140 may be formed as described above, for example by adhering together several lengths of corrugated sheet fiberboard material in the orientation of FIG. 10 and then cutting across the assembled sheets to form the desired opposing panel surfaces. In this case, one surface of the panel is flat and the other is curved, but opposing curved surfaces may be formed if desired, and other curved surface shapes with multiple curves, variable radius curves, compound curves or the like may also be formed.

Honeycomb panels may also be formed with one or both surfaces being angled, faceted surfaces, by appropriate cutting of upright strips or lengths of corrugated sheet material which have been adhered together at the abutting rib peaks. FIGS. 13A to 13C illustrate one embodiment of a honeycomb panel 145 with a faceted upper face 146. The lower part of FIG. 13A illustrates the honeycomb panel alone with a cut upper faceted face 146, while the upper part of FIG. 13A and FIGS. 13B and 13C illustrate a flexible panel or skin 148 laminated on the upper face. A lower flexible panel or skin may also be laminated on the lower face of panel 145.

FIG. 14A illustrates another embodiment of a honeycomb panel 150 which has curved upper and lower faces 152, while FIG. 14B illustrates a multi-layer panel comprising the panel or sheet 150 laminated inside an outer flexible panel or skin 153 or two flexible flat panels or skins which flex to adopt the desired curvatures.

FIG. 15A illustrates another embodiment of a honeycomb sheet 154 which has a flat lower face 155 and an angled upper face 156. FIG. 15A illustrates the lower flat face of sheet 154 adhered to a flexible flat panel or sheet 157. Panel 154 may be laminated between two flexible flat panels or sheets 157 to form a multi-layer panel 159, as illustrated in FIGS. 15B to 15D.

Figure 20:
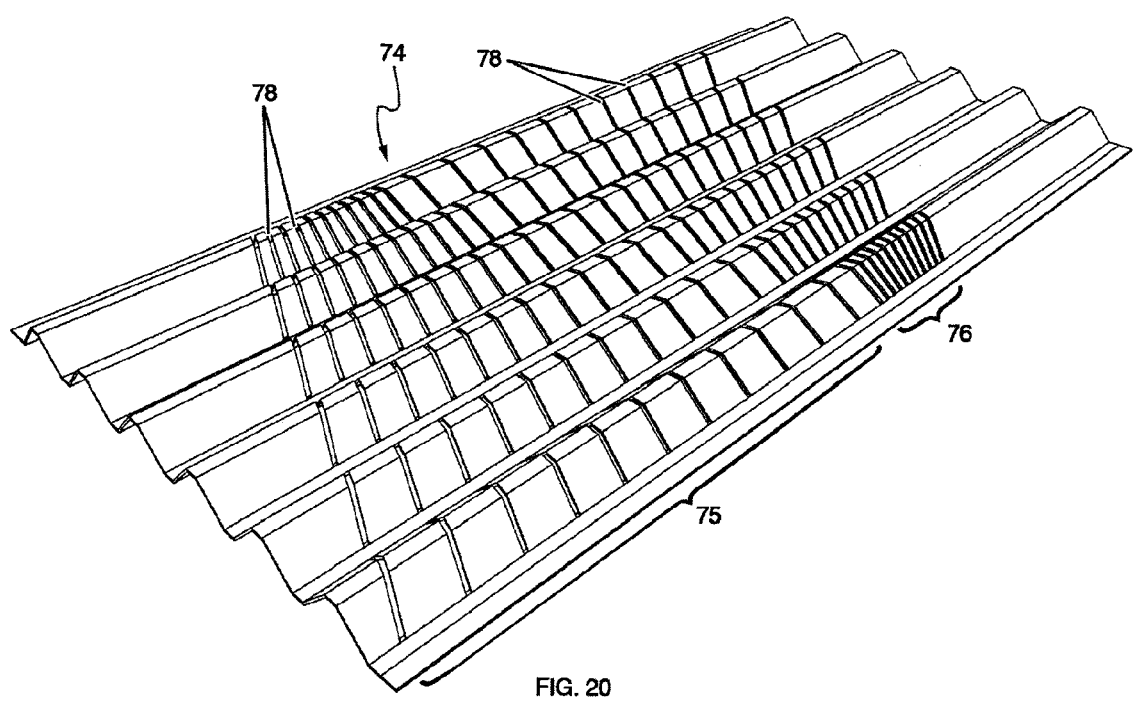
FIG. 20 is a perspective view of another embodiment of a slotted panel with an alternating radial slit configuration.
Figure 21:
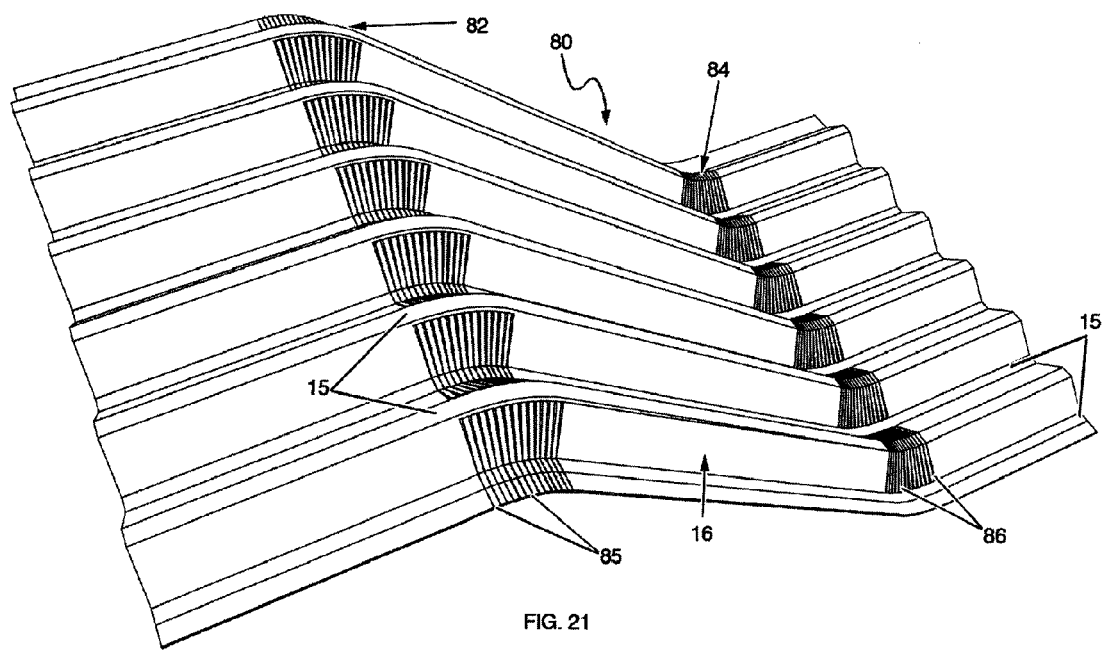
FIG. 21 is a perspective view of part of a slotted panel curved to form bends at the slotted portions.
Figure 22:
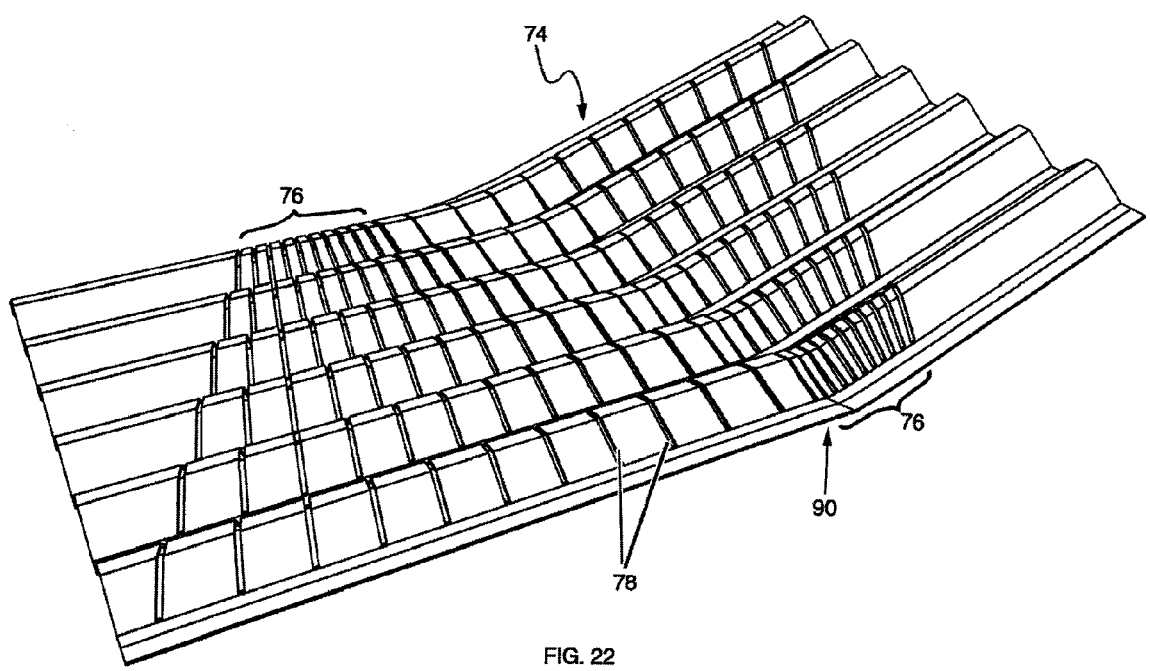
FIG. 22 is a perspective view illustrating a panel with alternating radial slits as in FIG. 20 with a bend formed at the one of the radial slit locations.
Figure 23:
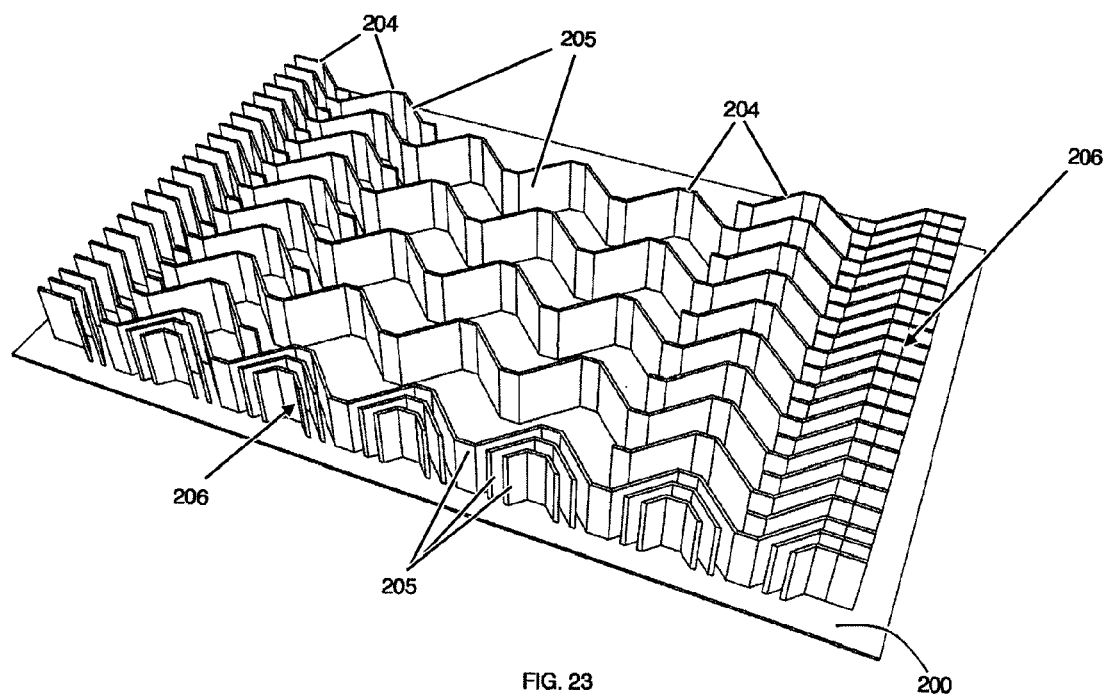
FIG. 23 is a perspective view of a lower flat sheet and core of another embodiment of a multi-layer fiberboard panel.

The corrugated or ribbed sheets of FIG. 1 may be cut with a number of slits across the ribs of the corrugated panel in various ways, allowing the panel to be bent into a curve for use as a stand-alone product or as a core component of a sandwich stressed skin panel. Some alternative slit configurations are illustrated in FIGS. 16 to 21, while FIGS. 22 and 23 illustrate how curves or bends may be formed at the slotted panel regions. The slits are cut across the ribs from one face of the panel, terminating short of the peaks or flanges of the ribs on the opposing face, or may be cut alternately from one face and the opposite face in some cases. The slits may extend across the entire width or only part of the panel width. The panel 60 in FIG. 16 has a plurality of spaced slotted regions 62 each having a series of spaced slits 64 extending perpendicular to the rib direction. Slits 64 extend through the uppermost webs 15 and side webs 16 in the illustrated orientation, but terminate short of the lowermost webs 15. Instead of spaced slotted regions as in FIG. 16, slits may be provided along the entire length of the panel. Slotted regions may also be provided alternately on opposite faces of the panel, for example regions 62 as in FIG. 16 cut through the uppermost ribs as seen in this drawing, with opposing slotted regions in the gaps between regions 62 cut through the lowermost ribs and terminating short of the peaks of the uppermost ribs. FIG. 17 illustrates another embodiment of a slotted panel 65 which has slits 66 extending perpendicular to the ribs and are arranged at variable spacings, with alternating regions of closely spaced slits and widely spaced slits.

Figure 17:
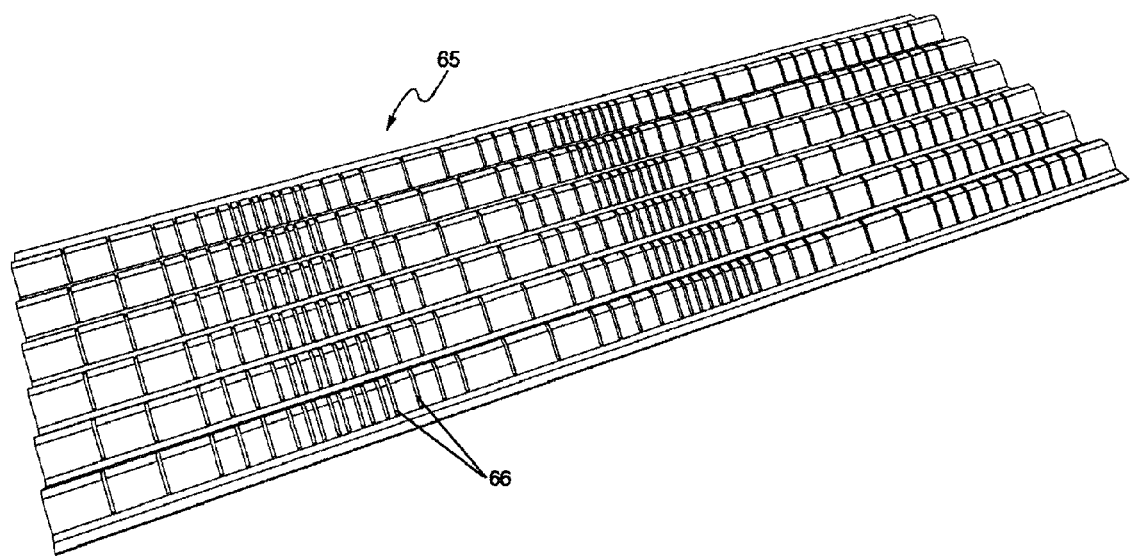
FIG. 17 is a perspective view of another slotted panel formed with slits at varying spacings.
Figure 18:
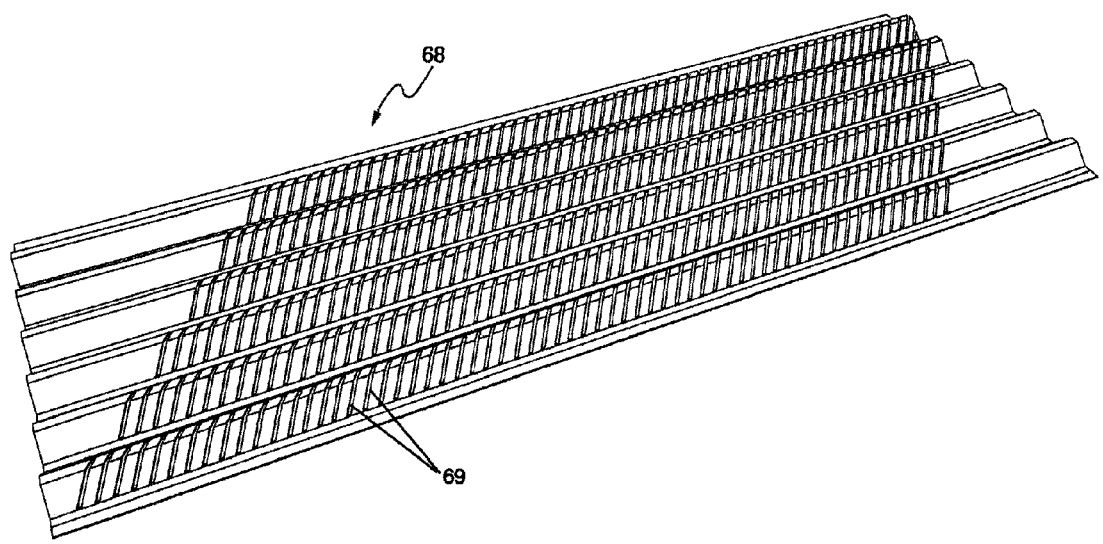
FIG. 18 is a perspective view of another embodiment of a slotted panel formed with diagonal slits.
Figure 19:
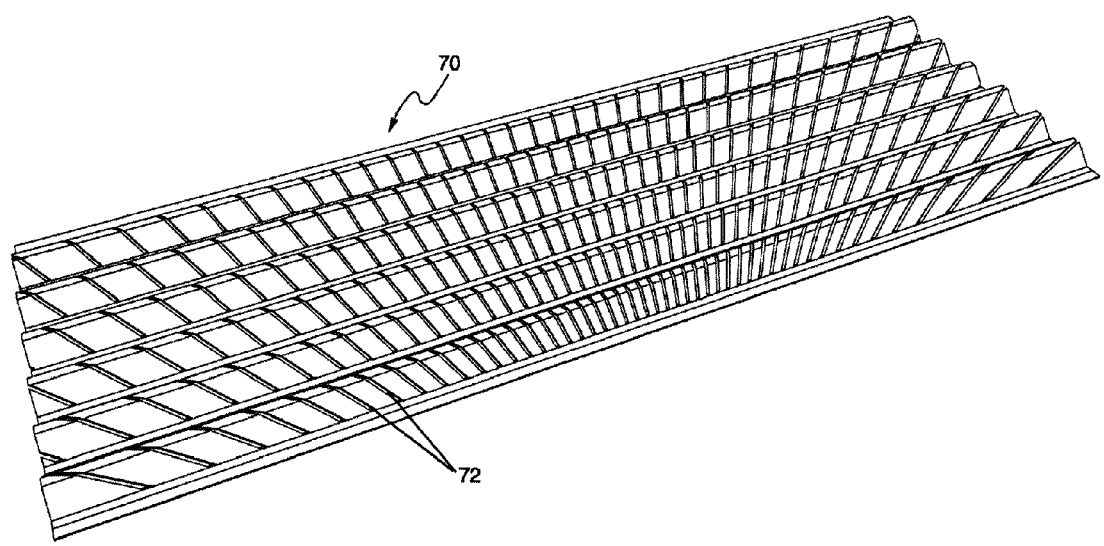
FIG. 19 is a perspective view of another embodiment of a corrugated panel formed with a radial slit configuration.

The panel 68 of FIG. 18 has slits 69 extending diagonal to the rib direction. Alternative versions of the panel 68 may have staggered groups of diagonal slits, alternating diagonal slits on opposite faces of the panel, or diagonal slits at variable spacings, as in FIG. 17. The panel 70 of FIG. 19 has slits 72 extending radially. In FIG. 20, a panel 74 is provided with alternating groups 75, 76 of radial slits 78, centered alternately on opposite sides of the panel. FIG. 22 illustrates the panel 74 of FIG. 20 with a bend or twist 90 formed at the location of the radial slits, generally at the junction between the two groups 76 of radial slits.

In one embodiment, slits are cut using a saw across the ribs of the corrugated panel from one face, not penetrating into the flanges along the opposite outer face of the panel, allowing the flanges along that outside plane to be continuous through the resultant curve. The panel may then be curved with the slits on the inside or the outside face of the curved panel. FIG. 21 illustrates one embodiment in which a slotted panel 80 has spaced slotted regions 82 and 84 which each have a series of perpendicular slits 85 and 86, respectively. The slits 85 are cut in the lower face as viewed in FIG. 21, extending through the lowermost ribs and terminating short of the peaks 15 of the uppermost ribs. The slits 86 are cut in the upper face and extend through the uppermost ribs, terminating short of the peaks of the lowermost ribs. The panel 80 is bent or curved in opposite directions at the slotted regions 82 and 84 to form first bend 88 and second bend 89. In each case, the slits 85 and 86 are positioned on the inside or concave part of the curve. It is helpful to position the slits on the inside of the curve due to the resultant limit when the slits close in towards each other as the panel is curved. A mathematical formula with rib height, slit width, on-center dimensions between slits determines the resultant inside and outside radius "stop" of the curves. The basic formula allows easy design to fabrication methods.

One version includes fixing the resultant curve with adhesive when the corrugated panel with slits is bent/curved to its automatic stop. The adhesive is applied between the slits at the inside of the curve where the slit closes due to the curving. Another version utilizes an additional strip of flat material with a width similar to that of the flange which has been slitted. The strip is adhered to the inside or outside face of the slitted flange, fixing the curve.

Slits can be designed in a variety of configurations, some of which are illustrated in FIGS. 16 to 22. These include perpendicular continuous, perpendicular with variable spacing (FIG. 17), perpendicular staggered (FIG. 16), perpendicular alternating, perpendicular alternating and staggered (FIG. 21), diagonal (FIG. 18), diagonal staggered, diagonal alternating, radial (FIG. 19), radial alternating to opposite sides of the panel (FIGS. 20 and 22), radial alternating on opposite faces of the panel, radial staggered, compound radial, variable on center slits to produce compound, variable radius curves, and so on.

Panels with slits as in FIGS. 16 to 22 can be used as stand-alone elements for interior design, containers, partitions and screens, ceiling tiles, and formwork for plaster, concrete and the like.

There are some benefits to making panels with curves using slits to make the curved sections more flexible. First, there is little or no "spring back" or "memory." Many methods of creating curves include bending of veneers or sheets or panels into a shape and fixing while setting. Such products typically spring back somewhat in the direction of the original shape. Curved panels made using slits as described above are stable in the finished shape since they contain little or no residual memory stress when in the set curved form. Curved, slotted rib panels may be stand alone or may have curved flat panels or skins adhered to their outer faces. This technique may be used to fabricate curves of multiple desired radii, including custom and compound curves.

FIG. 23 illustrates a lower flat panel or sheet 200 and core 202 of another embodiment of a stressed skin panel. In this embodiment, plural internal independent ribs are placed to provide structural and strength to weight performance. An upper flat panel or sheet (not illustrated) is placed over the upper surface of the core and secured to the upper rib edges 204 in order to complete the panel assembly.

In this embodiment, the ribbed or corrugated panel 100 of FIG. 1 is cut into wave-like strips 205 of varying lengths and the strips are placed or adhered in varying positions on the inside face of the stressed skin panel 200 before adhering those strips to the inner face of an upper stressed skin panel. The ribs are generally perpendicular to the plane of the panel, although the webs may be placed at an angle with respect to the plane of the panel in alternative embodiments. Significant versatility of shape, thickness and strength can be achieved by variation of strip width and shape. In addition, by changing corrugated panel thickness and material cross section dimension, the completed panel with the rib core can achieve performance and design variations.

Since the ribs have a wave shape, they are stable and resistant to collapse when placed freestanding on the first face of the stressed skin panel, unlike a simple straight planar rib. Variable finished product depth, shape and other characteristics can be achieved by the using corrugated sheets 100 of varying dimensions and cross-sectional shapes to make the ribs or strips 205, and by varying the width and shape of the strips. This arrangement allows for flexibility in layout of the ribs, with a greater number of ribs placed closer together in regions of the panel requiring reinforcement to increase strength in those regions. For example, in the arrangement of FIG. 23, a greater rib density is provided in the edge regions 206 of the panel, with fewer ribs in the central region. Different arrangements may be provided to reinforce the panel at junctions. If the panel is intended for use as a raised support surface on legs, additional ribs are placed above the legs for added support.

Advantages of this new method of creating stressed skin panels over other methods include: flexibility of layout, control of position and structural design, applying material only where needed, to provide improved strength to weight characteristics. Such a panel can not be replicated by using paper or cardboard honeycomb as ribs made from those materials are not structurally adequate to provide the core strength, nor are they able to stand on their own since they do not have a wave geometry. Uses of a panel manufactured as indicated in FIG. 23 include furniture finished product or core elements, packaging, containers, pallets and the like, as well as interior partitions or screens, decorative wall panels, core materials for planar stressed-skin panels or complex forms and shapes used in furniture, art and construction products or sub assemblies. Lounges, chairs, tables and other furnishing may also utilize such panels, in addition to aerospace, marine, rail and other transportation applications.

Panels made using a core as illustrated in FIG. 23 have advantages over other light weight stressed skin panels in that material can be placed easily only where needed to provide the strength required, unlike honeycomb and other core materials which are continuous and do not vary in strength along the length and breadth of the core. This provides design flexibility to add material only where it is needed thereby reducing weight for a specified structural performance.

Figure 24:
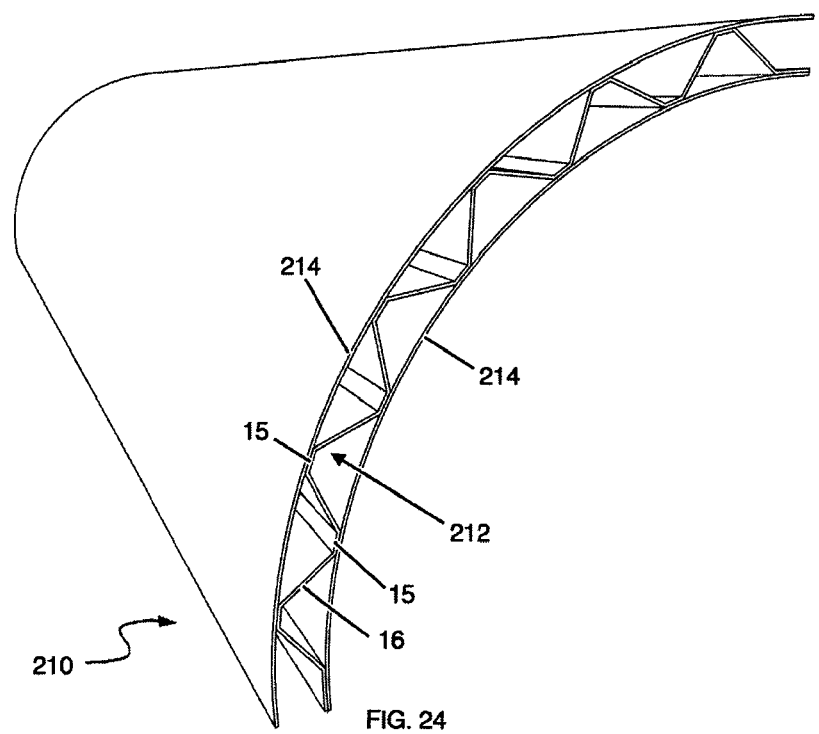
FIG. 24 is a perspective view of one embodiment of a curved stressed skin panel using a corrugated sheet as the core.
Figure 24A:
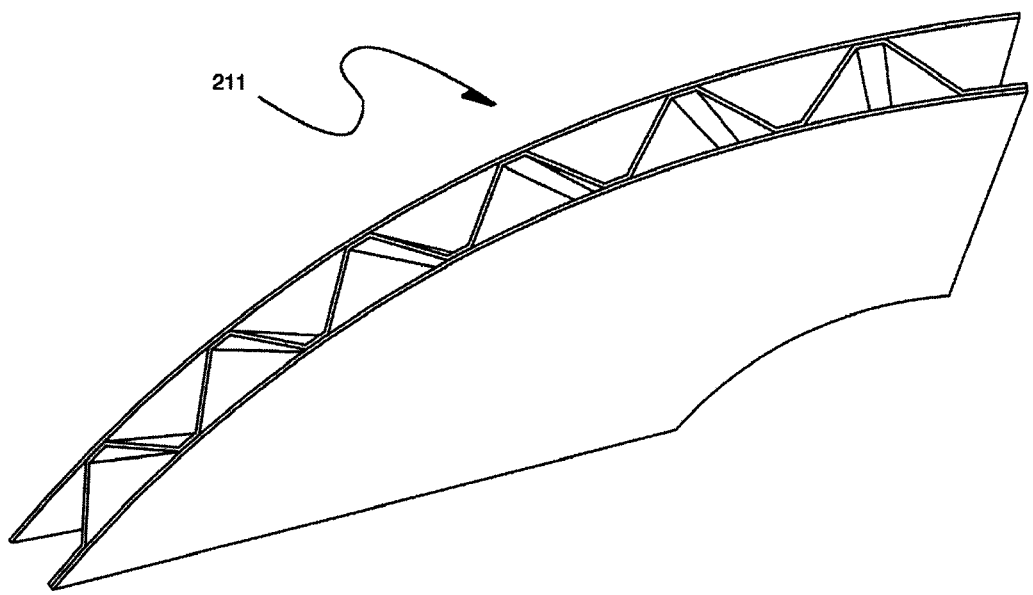
FIG. 24A to 24D illustrate some alternative curved, stressed skin panel shapes.
Figure 24B:
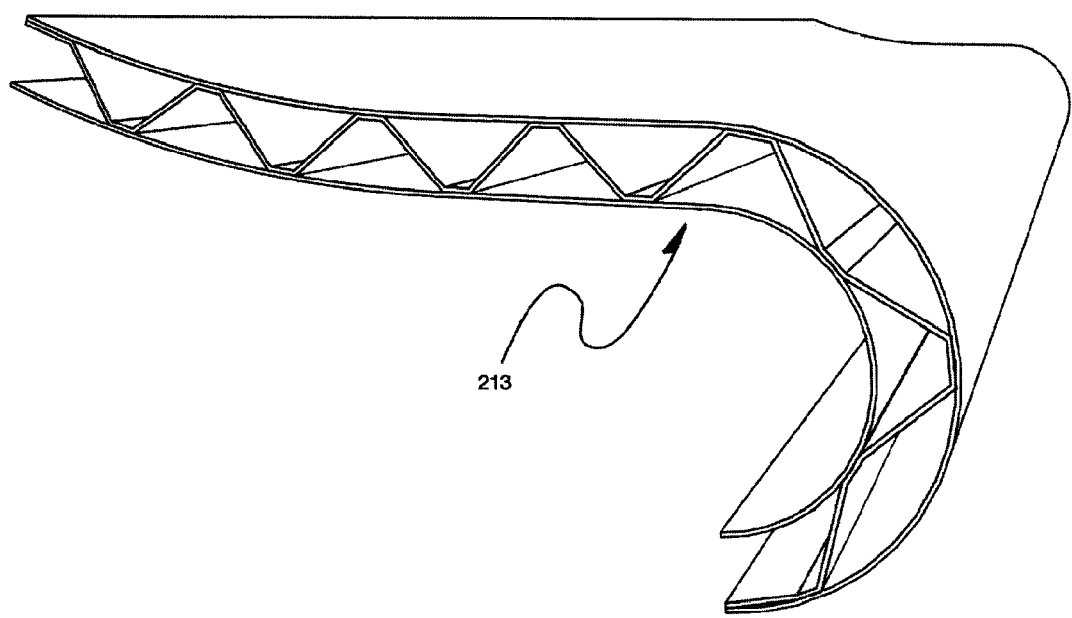
Figure 24C:
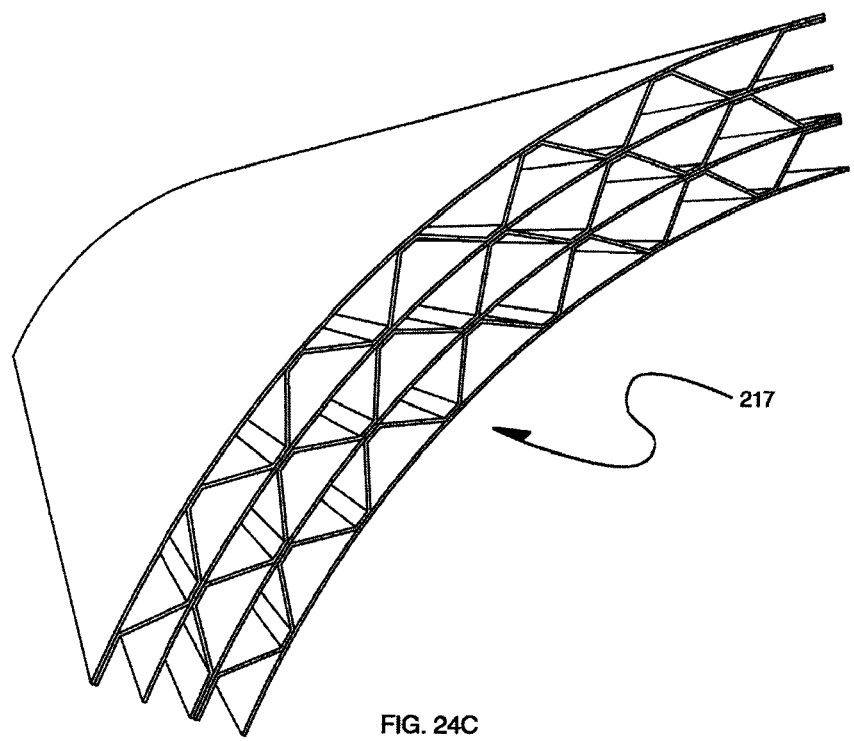
Figure 24D:
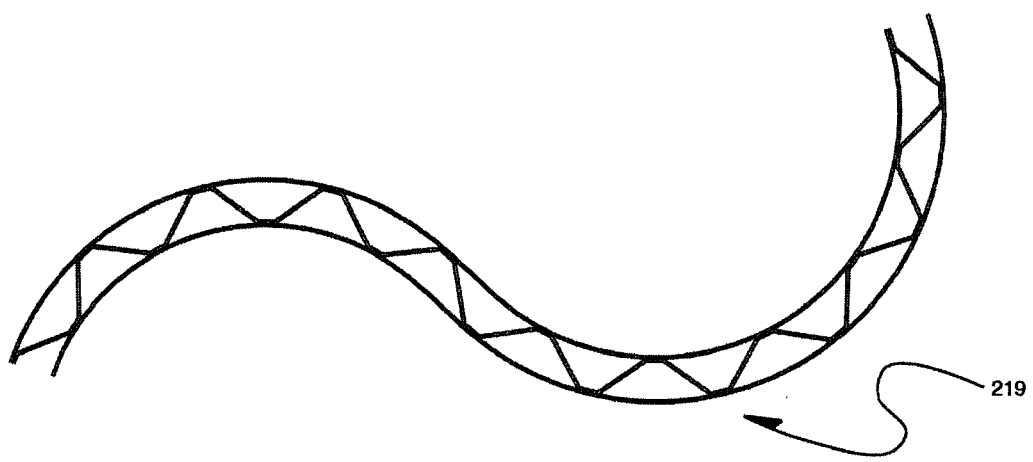

FIG. 24 illustrates one embodiment of a curved stressed skin panel 210. Panel 210 comprises an inner core 212 of corrugated sheet material 100 arranged with the ridges or ribs 15 running perpendicular to the direction of curvature, and outer flexible skins or sheets 214 laminated on opposite sides of the inner core 212. FIGS. 24A to 24D illustrate some examples of different curved panel shapes and multi-ply panels which may be formed in a similar manner. FIG. 24A illustrates a panel 211 having a simple curve. FIG. 24B illustrates a panel 213 having a compound curve. FIG. 24C illustrates a panel 217 having multiple plies or alternating layers of flat flexible sheets and corrugated sheets. FIG. 24D illustrates a curved panel 219 with alternating curves.

In an alternative embodiment, as illustrated in FIGS. 25 and 26, a curved stress skin panel 215 comprises a corrugated core sheet 216 with slits 217 extending transversely across the ribs, similar to the embodiments described above in connection with FIGS. 16 and 17, positioned between two outer flexible skins or sheets 218 and oriented with ridges 15 running parallel to the direction of curvature. Using the corrugated panel, the material is sawed down to the flange (or vice-versa from the flange outward) without cutting all the way through. This cutting technique allows for both concave and convex curves. Sheet 216 is oriented so that the slits 217 face inwardly into the curve (i.e. the sheet 216 is positioned with its slotted face facing inward or on the convex side of the curve), and tend to close at their inner ends 219, as best illustrated in FIG. 25B. Using corrugated core to make curved panels allows for more precision and the curves can be made on a diagonal/radial/angular basis. This allows for much easier adaptation for design requirements.

A curved, uniform thickness stressed skin panel may also be made using a honeycomb core 100 as in FIG. 9 which is either bent or trimmed/cut to the desired curved shape, with one or two skins which may be pre-curved or made of bendable flat material. The curves of any of the curved stressed skin panels may be single radius, variable radius, or alternating radius. In alternative embodiments, the curves may be multi-ply with two or more core layers in the cross section.

Using the above techniques to make a curved panel means that much less material is cut in order to make the curve. This process is much easier to use since the core material, the corrugated or honeycomb panel, is much lighter and easier to handle while fabricating. The disadvantage of using other materials to curve (particleboard, traditional MDF, plywood) is that the system used to curve those panels ("kerfing") uses very heavy and thick materials. Cutting these heavy and thick materials results in much less precise cuts and flexibility while fabricating.

The curved panels of FIGS. 24 to 26 can be used in a large variety of furniture, interior design, artistic wall panels, trade show booths, stage sets, and other applications. This provides a range of design capabilities for architects, interior designers, furniture makers, and the like.

Figure 16:
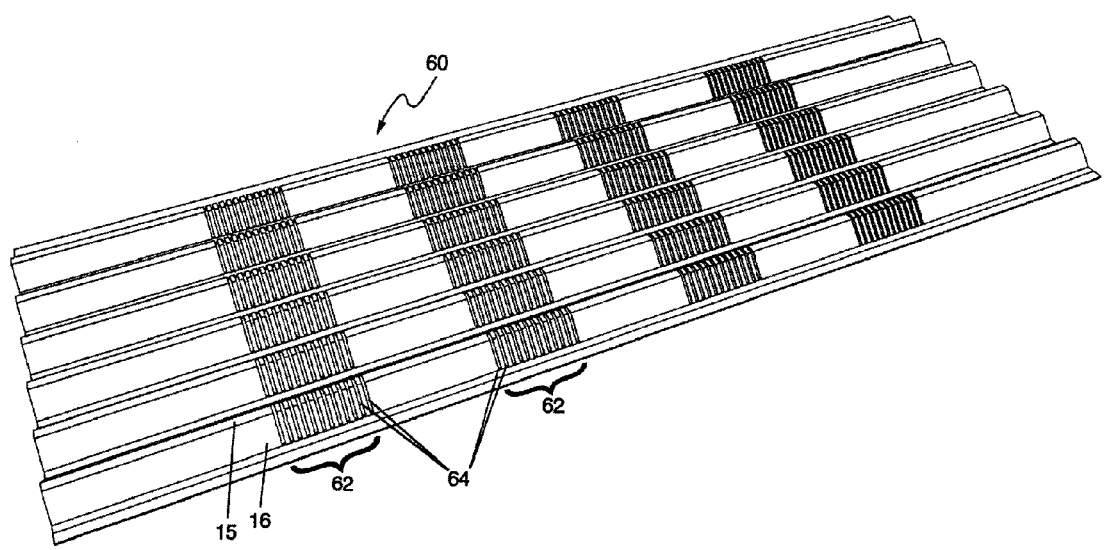
FIG. 16 is a perspective view of a slotted panel formed with spaced slotted portions of parallel slits.
Figure 27:
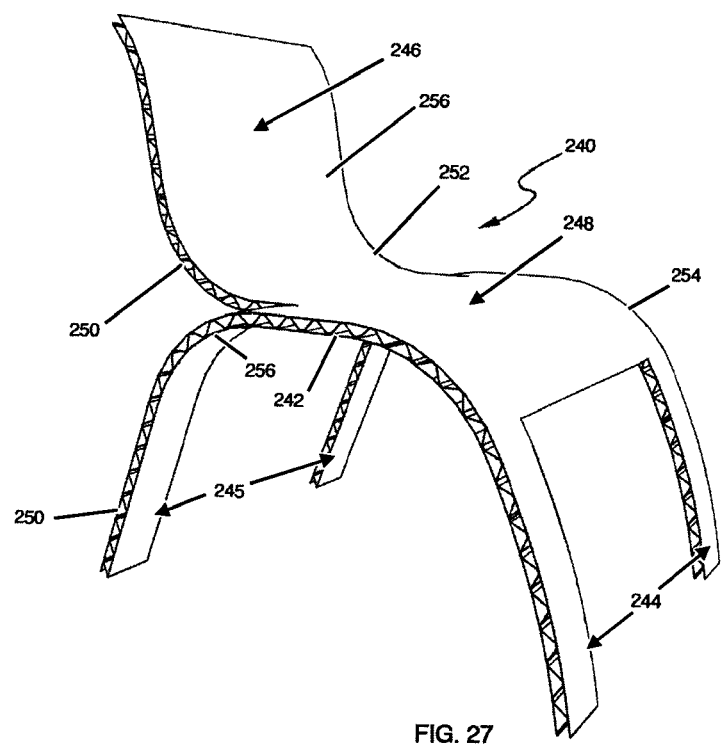
FIG. 27 is a front perspective view of one embodiment of a chair manufactured using a multi-radius curved panel.

FIG. 27 illustrates a chair 240 formed from a length of curved, three ply panel having a core of corrugated sheet 10, honeycomb sheet 100, or slotted sheet with perpendicular slits (FIG. 16 or 21). The chair 240 is formed over a rigid form or mold in a shape matching that of the finished chair shape. A first layer 242 of flexible, flat fiberboard sheet is laid over the form and is suitably cut and curved to follow the shape of the chair front legs 244, rear legs 245, back 246, and seat 248. A layer 250 of a suitable core material is cut to shape and then curved over and adhered to the upper surface of the first layer. Any of the panels or cores described above in connection with FIGS. 1 to 5 and 9 to 22 may be used for the layer 250. If the core layer 250 is of corrugated sheet material 10 of FIG. 1, it is laid with the ribs running transverse to the chair curvature so that it can bend to adopt the curved shape. If core layer 250 is a slotted sheet as described above in connection with FIGS. 16 to 22, it is laid to run along the length of the chair from back to seat to legs. In this case, the slits may be cut appropriately at the locations of curves 252, 254, and 255 so as to face inwardly relative to each curve. In other words, in the region of curve 252 between the back and seat portion of the chair, slits are formed through the upper ribs of the sheet, while slits are formed through the lower ribs of the sheet in the region of curve or bend 254. The core layer may also be a layer of the honeycomb sheet 100. After the core layer 250 is adhered to the lower layer, an upper layer 256 of flat fiberboard sheet is curved over and adhered to core layer 250.

Chair 240 is thus manufactured in a multi-radius curve from one continuous piece of curved panel. The chairs 240 are readily stackable for storage purposes. This method of making a chair from a three ply cut and curved panel uses a minimal amount of material, since only one 3Ply panel is needed to make each chair, and this technique provides many lightweight, artistic furniture options. The material is also extremely lightweight, versatile for curving, and strong. The chair may be formed with arms if desired, by cutting additional strips at the outer edges to form the arms, for example. Other curved chair designs may be made in a similar manner, along with other types of furniture such as loungers, benches, tables, and the like. The curved panel material is made from three panels or sheets which are individually flexible so that they can be bent readily to adopt any desired shape, but which are fixed and rigid when assembled and adhered together, providing a strong yet lightweight piece of furniture. The curved panel chair of FIG. 27 has no spring back memory, unlike such shapes formed from existing wood panel materials that tend to have some spring back tendency after forming.

FIGS. 28A to 28D illustrate a cylindrical tube 260 formed from corrugated, slotted fiberboard sheet cut with a plurality of spaced, perpendicular slits 261 across the ribs, the slits extending from one face (the innermost face of the formed bin) towards the opposite face, terminating short of the flat flanges 262 which are on the outside of the formed bin. The slits are evenly spaced along the length of the sheet in this case (i.e. as in regions 62 of FIG. 16 but extending along the entire length of the sheet with no interruptions). The slotted sheet is bent into a cylinder with the slits 261 oriented vertically and facing into the inside of the bin, so that they tend to close at their inner ends 263 on the inner flat flanges 264. The curved shape may be fixed with adhesive between the inner ends of the slits. Additionally, the abutting ends of the sheet may be secured together with a suitable adhesive. Bands or strips of flat material (not illustrated) with a width similar to that of the flat flanges or ends 264 of the ribs may adhered around the outside face of each of the outer grooves in the bin, i.e. over the flanges 264. The tube has opposite open ends 265.

The cylindrical tube 260 may be used in many different applications, such as formwork for spiraling columns; decorative elements; an esthetic tubular lighting element; wall sconce; concrete forms; and the like. In one embodiment, one open end of the tube may be closed by a circular piece of flat panel material, such as the rigid three ply panel of FIG. 4 or 11. The resultant structure may be used as a waste bin or storage bin. Although the tube 260 is cylindrical in the illustrated embodiment, it may be made in many other possible shapes, such as triangular, circular segment, and hexagonal shapes. Tubes may also be made in rectangular or square shapes in a similar manner. For any angled shapes, slits may be provided in the corrugated sheet just in the regions where the angled bends are to be formed, rather than along the entire sheet as in FIGS. 28A to 28D. Tube 260 may alternatively be made from corrugated sheet without slits as in FIG. 1, with the ribs running vertically along the tube, in any desired cross-sectional shape. Tubes may also be made from the curved panels of FIGS. 24 to 26 in alternative embodiments.

A tube may alternatively be made from a corrugated sheet 68 as in FIG. 18 with diagonal slits 69 at a 45 degree angle to the rib direction. The diagonally slotted sheet is folded or bended longitudinally to form a closed curve, with the edges suitably secured together with adhesive, creating a long spiraling tube. The sheet 68 may be wound spirally to form a tube in which the ribs spiral along the length of the tube to create a decorative effect. Adhesive may also be applied between the slits for added support. Such a tube may also be used as formwork for spiraling columns; decorative elements; an esthetic tubular lighting element; wall sconce; concrete forms; and the like.

The sliced core sheet material makes it much easier to create a consistent, complex geometrical shape for either esthetic or functional uses. Currently existing panel materials do not lend themselves to shaping and curving in this manner and have to be combined with other materials to achieve such a shape. The tube 260 is an extremely lightweight, decorative and functional instrument. Other options are simply too heavy, too thick, or too dense to allow for such versatile applications The engineered molded fiber panels described above provide a family of high strength-to-weight, versatile component panel products which may be combined in a range of light weight structural panels with desirable surface features, consistency, shape, pliability, versatility, strength and other performance characteristics. Corrugated and honeycomb core panels can be used by product manufacturers to create highly engineered and crafted end products which require a relatively low level of embedded material for required structural performance and thus are relatively light weight. The panels may be nestled in a small volume for shipping and storage, utilizing as little as 10% of the volume required to ship and store commodity panel products. Standard wood fabrication tools and techniques may be used in most cases. Since conventional wood splintering does not occur with a molded fiberboard panel, no gloves are required. The panel edges may be fastened, edged, laminated and veneered as desired, providing significant design fabrication and application versatility. The corrugated or honeycomb shaped sheets and flat panels or skins described above are flexible prior to being adhered together. Once laminated they form lightweight stressed-skin panels with relatively high strength, while maintaining some flexibility characteristics. The panels may be formed into self supporting soffets and valances without the need for an elaborate secondary structural frame.

The panels described above are made from recovered resources including waste paper and cardboard, wood residue, waste and under-utilized agricultural fiber, thus turning low cost raw materials into high quality panels. There is little or no toxic off-gassing during fabrication or after installation as often found in other panel materials. The manufacturing process is environmentally friendly with the ability to utilize local recycled and/or agricultural resources, creating the opportunity to site a manufacturing plant virtually anywhere in the world. This process also provides an alternative to virgin forest products, potentially lessening the impact of global deforestation, preserving habitat, encouraging sustainable business practices, and providing increased markets for post-consumer fiber waste. Little or no pollution is generated in the manufacturing process. The panel system is a very flexible three-dimensional engineer-able system that has many attractive performance characteristics. For example, the above panels may be engineered to have the same approximate bending stiffness as commercial grade particleboard (PB), but at approximately ¼ the weight.

The panel materials described above may be modified and coatings may be applied to enhance the water resistant properties. The panels also may be fire-retardant treated if used in applications requiring high classification in building fire performance.

To summarize, some of products' other unique features include light weight, providing reduced shipping and handling costs, decreased risk of workplace injuries and workers compensation claims, and increased consumer mobility. The panels utilize fiber selection, fiber processing, and 3D design to provide an engineered system that reduces weight per performance needs. The panels are also of high strength, providing increased product life, decreased damage in shipping and handling, and versatility in a number of product applications. They are also readily curvable, as described above, providing quick, cost-effective structural curves in custom and even compound radii, giving designers and manufacturers tremendous fabrication flexibility and a broader scope of possible market applications. The panels are relatively easy and inexpensive to fabricate, providing the ability to cut, fasten, laminate and edge using standard woodworking equipment and industrial techniques. Products made with the panels are eco-friendly, providing products with high recycled content, as well as reduced or minimum off-gassing and toxicity. The panels can be engineered from fibers to 3D geometry to final panel system to provide high performance while significantly reducing or minimizing total environmental impact. The panels can be made without resin, or with formaldehyde-free resins.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A fiberboard product, comprising:
a single multi-ply panel having first and second outer layers of flexible flat fiberboard material and a core layer of flexible flat fiberboard material secured between the outer layers, the layers being flexible prior to assembly and the assembled layers being substantially rigid;
the core layer including fiberboard sheet portions with voids between the portions;
the panel being cut and shaped to form a tubular product having opposite open ends; and
a flat panel secured across one open end of the tubular product to form a bin;
wherein the core layer comprises a honeycomb shaped sheet of molded fiberboard material having a plurality of open-ended hexagonal cells oriented transverse to the outer layers with the open ends facing the respective first and second outer layers.

2. A tubular product, comprising:
a sheet of molded fiberboard material of corrugated shape having opposite first and second faces and opposite ends, each face having a plurality of alternating ribs and grooves extending in a first direction along the sheet, and a plurality of spaced slits extending transversely across the ribs in the first face and terminating short of the outer ends of the ribs in the second face;
the sheet being formed into a closed tube with the first face facing inwards into the tube and the alternating ribs and grooves extending around the periphery of the tube, whereby the tubular product has alternating ribs and grooves and spaced rows of slits along its length, and the alternating ribs and grooves and spaced rows of slits are visible on the outside and inside of the tubular product.

3. The tubular product of claim 2, wherein the sheet is formed into a spiraling tubular shape.

4. The tubular product of claim 2, wherein the sheet is formed into a cylindrical tubular shape with alternating ribs and grooves extending circumferentially around the cylindrical tubular product.

5. The tubular product of claim 4, further comprising an annular strip of flexible flat material secured in each groove in the outer face of the tubular shape.

6. The tubular product of claim 2, wherein the sheet is formed into a rectangular tubular shape having four corner regions.

7. The tubular product of claim 6, wherein the slits are formed in spaced slotted regions of the sheet only, each slotted region corresponding to a respective corner region.

8. A multi-layer fiberboard panel, comprising:
first and second core layers of corrugated fiberboard sheet material having opposite outer and inner faces with a plurality of ribs and grooves on each face, the core layers positioned with their ribs and grooves extending parallel to one another, each rib having a flat peak and the flat peaks of the ribs on the inner face of the first layer aligned and adhered with the flat peaks of the ribs on the inner face of the second core layer to form a plurality of open cells of hexagonal shape between the core layers;

third and fourth layers of flat molded fiberboard material, the third layer having an inner face secured to the flat peaks of the ribs on the outer face of the first core layer and the fourth layer having an inner face secured to the flat peaks of the ribs on the outer face of the second core layer;

fifth and sixth layers of corrugated fiberboard sheet material secured to the outer faces of the third and fourth layers, respectively, the fifth and sixth layers having a plurality of ribs and grooves extending parallel to one another and perpendicular to the ribs and grooves of the first and second layers; and seventh and eighth layers of flat molded fiberboard material secured to the outer faces of the fifth and sixth layers, respectively.

* * * * *